United States Patent
Jain et al.

(10) Patent No.: US 10,754,844 B1
(45) Date of Patent: Aug. 25, 2020

(54) EFFICIENT DATABASE SNAPSHOT GENERATION

(71) Applicant: Amazon Technologies, Inc., Seattle, WA (US)

(72) Inventors: Vaibhav Jain, Seattle, WA (US); Tate Andrew Certain, Seattle, WA (US); James Christopher Sorenson, III, Seattle, WA (US); Sharatkumar Nagesh Kuppahally, Bellevue, WA (US); Akshat Vig, Seattle, WA (US); Go Hori, Seattle, WA (US); Chase Kernan, Seattle, WA (US); Naveen Ganapathi Subramanian, Foster City, CA (US); Nicholas Gordon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 15/717,614

(22) Filed: Sep. 27, 2017

(51) Int. Cl.
*G06F 11/14* (2006.01)
*G06F 16/23* (2019.01)

(52) U.S. Cl.
CPC ...... *G06F 16/2358* (2019.01); *G06F 11/1451* (2013.01); *G06F 11/1469* (2013.01); *G06F 2201/84* (2013.01)

(58) Field of Classification Search
CPC ............. G06F 11/1471; G06F 11/3476; G06F 11/1461; G06F 2201/84
See application file for complete search history.

(56) References Cited

U.S. PATENT DOCUMENTS

| 5,586,264 A | 12/1996 | Belknap et al. |
| 5,615,364 A | 3/1997 | Marks |
| 5,692,177 A | 11/1997 | Miller |
| 5,768,527 A | 6/1998 | Zhu et al. |

(Continued)

FOREIGN PATENT DOCUMENTS

| CN | 104750773 | 7/2015 |
| JP | 2014141343 | 8/2017 |
| WO | 2012168365 | 12/2012 |

OTHER PUBLICATIONS

Aghaei et al., Towards a Scalable and Write-free Multi-version Checkpointing Scheme in Solid State Drives, 2016 46th Annual IEEE/IFIP International Conference on Dependable Systems and Networks, pp. 37-48. (Year: 2016).*

(Continued)

*Primary Examiner* — Cheyne D Ly
(74) *Attorney, Agent, or Firm* — Robert C. Kowert; Kowert, Hood, Munyon, Rankin & Goetzel, P.C.

(57) ABSTRACT

Various systems and methods to efficiently store backups of partitions of a database are disclosed. An indication to take a current snapshot of a partition of the database is received. A log size and operation type statistics are determined for a portion of the change log for the partition. A snapshot type is determined for the partition based at least in part on the log size and the operation type statistics, where the snapshot type specifies a log-based snapshot or a full snapshot. The snapshot is stored as metadata indicating a point in the change log if the determined snapshot type is log-based snapshot or stored as complete data of the partition if the determined snapshot type is full snapshot.

20 Claims, 10 Drawing Sheets

(56) References Cited

U.S. PATENT DOCUMENTS

| | | | |
|---|---|---|---|
| 5,813,009 A | 9/1998 | Johnson et al. | |
| 5,842,222 A | 11/1998 | Lin et al. | |
| 5,991,772 A | 11/1999 | Doherty et al. | |
| 6,085,200 A | 7/2000 | Hill et al. | |
| 6,161,109 A | 12/2000 | Matamoros et al. | |
| 6,199,074 B1 | 3/2001 | Kern et al. | |
| 6,272,598 B1 | 8/2001 | Arlitt et al. | |
| 6,374,266 B1 | 4/2002 | Shnelvar | |
| 6,374,267 B1 | 4/2002 | Tam | |
| 6,397,351 B1 | 5/2002 | Miller et al. | |
| 6,505,216 B1 | 1/2003 | Schutzman et al. | |
| 6,651,077 B1 | 11/2003 | East et al. | |
| 6,728,879 B1 | 4/2004 | Atkinson | |
| 7,096,392 B2 | 8/2006 | Sim-Tang | |
| 7,328,226 B1 | 2/2008 | Karr et al. | |
| 7,330,859 B2 | 2/2008 | Gupta et al. | |
| 7,343,356 B2 | 3/2008 | Prahlad et al. | |
| 7,353,241 B2 | 4/2008 | Erlingsson | |
| 7,373,364 B1 | 5/2008 | Chapman | |
| 7,386,586 B1 | 6/2008 | Headley et al. | |
| 7,509,358 B1 | 3/2009 | Bingham et al. | |
| 7,546,428 B1 | 6/2009 | McAndrews et al. | |
| 7,565,661 B2 | 7/2009 | Sim-Tang | |
| 7,606,481 B2 | 10/2009 | Kuruma | |
| 7,606,841 B1 | 10/2009 | Ranade | |
| 7,606,844 B2 | 10/2009 | Kottomtharayil | |
| 7,653,668 B1 | 1/2010 | Shelat et al. | |
| 7,657,781 B1 | 2/2010 | Dixon et al. | |
| 7,668,876 B1 | 2/2010 | Kulkami | |
| 7,680,843 B1 | 3/2010 | Panchbudhe et al. | |
| 7,689,597 B1 | 3/2010 | Bingham et al. | |
| 7,716,186 B2 | 5/2010 | Cannon et al. | |
| 7,730,034 B1 | 6/2010 | Deflaux et al. | |
| 7,792,802 B1 | 9/2010 | Rao | |
| 7,802,001 B1 | 9/2010 | Petry et al. | |
| 7,921,077 B2 | 4/2011 | Ting et al. | |
| 7,949,662 B2 | 5/2011 | Farber et al. | |
| 8,041,679 B1 | 10/2011 | Narayanan | |
| 8,065,278 B2 | 11/2011 | Beatty et al. | |
| 8,078,582 B2 | 12/2011 | Wang et al. | |
| 8,095,745 B1 | 1/2012 | Schmidt et al. | |
| 8,095,756 B1* | 1/2012 | Somavarapu | G06F 11/1453 |
| | | | 711/162 |
| 8,099,391 B1* | 1/2012 | Monckton | G06F 11/1451 |
| | | | 707/647 |
| 8,108,343 B2 | 1/2012 | Wang et al. | |
| 8,117,164 B2 | 2/2012 | Spektor et al. | |
| 8,161,255 B2 | 4/2012 | Anglin et al. | |
| 8,166,263 B2 | 4/2012 | Prahlad et al. | |
| 8,190,960 B1 | 5/2012 | Bahadur et al. | |
| 8,200,615 B2 | 6/2012 | Halliday | |
| 8,244,679 B1 | 8/2012 | Bilsborough | |
| 8,255,739 B1 | 8/2012 | Chatterjee et al. | |
| 8,332,842 B2 | 12/2012 | Bauer et al. | |
| 8,359,596 B2 | 1/2013 | Kobayashi et al. | |
| 8,364,648 B1 | 1/2013 | Sim-Tang | |
| 8,386,631 B2 | 2/2013 | Nilsson et al. | |
| 8,386,771 B2 | 2/2013 | Baker et al. | |
| 8,463,633 B2 | 6/2013 | Jung et al. | |
| 8,478,726 B2 | 7/2013 | Habermann et al. | |
| 8,488,661 B2 | 7/2013 | Menon et al. | |
| 8,510,270 B2 | 8/2013 | Pareek et al. | |
| 8,515,964 B2* | 8/2013 | Ravikumar | G06F 16/325 |
| | | | 707/747 |
| 8,521,695 B2 | 8/2013 | Zwilling et al. | |
| 8,533,478 B2 | 9/2013 | Aguilera et al. | |
| 8,543,746 B2 | 9/2013 | Roever | |
| 8,548,945 B2 | 10/2013 | Dwyer et al. | |
| 8,566,286 B1 | 10/2013 | Hawton et al. | |
| 8,572,091 B1 | 10/2013 | Sivasubramanian et al. | |
| 8,612,700 B1 | 12/2013 | Armstrong et al. | |
| 8,626,709 B2 | 1/2014 | Isaacson et al. | |
| 8,635,187 B2 | 1/2014 | Beatty et al. | |
| 8,650,155 B2 | 2/2014 | Corbin et al. | |
| 8,676,752 B2 | 3/2014 | Kundu et al. | |
| 8,712,970 B1 | 4/2014 | Sim-Tang | |
| 8,719,362 B2 | 5/2014 | Wu et al. | |
| 8,725,934 B2 | 5/2014 | Batwara et al. | |
| 8,805,810 B2 | 8/2014 | Lucas | |
| 8,818,954 B1 | 8/2014 | Bergant et al. | |
| 8,825,938 B1 | 9/2014 | Ellard et al. | |
| 8,892,938 B1 | 11/2014 | Sundaram et al. | |
| 9,003,139 B1* | 4/2015 | Shivdeo | G06F 11/1451 |
| | | | 711/156 |
| 9,183,200 B1 | 11/2015 | Liu et al. | |
| 9,235,606 B1 | 1/2016 | Mooney et al. | |
| 9,552,382 B2 | 1/2017 | Barrus | |
| 9,558,078 B2 | 1/2017 | Farlee et al. | |
| 9,645,892 B1* | 5/2017 | Patwardhan | G06F 11/1466 |
| 9,703,640 B2 | 7/2017 | Beatty et al. | |
| 9,720,620 B1 | 8/2017 | Wei et al. | |
| 9,720,991 B2 | 8/2017 | Kritchko et al. | |
| 9,785,510 B1 | 10/2017 | Madhavarapu et al. | |
| 10,162,715 B1 | 12/2018 | Macdonald Mcalister et al. | |
| 2002/0114341 A1 | 8/2002 | Sutherland et al. | |
| 2002/0152299 A1 | 10/2002 | Traversat et al. | |
| 2003/0220935 A1 | 11/2003 | Vivian et al. | |
| 2004/0215803 A1 | 10/2004 | Traversat et al. | |
| 2005/0022213 A1 | 1/2005 | Yamagami | |
| 2005/0188256 A1 | 8/2005 | Stager et al. | |
| 2005/0251540 A1 | 11/2005 | Sim-Tang | |
| 2006/0020634 A1 | 1/2006 | Huras et al. | |
| 2006/0047931 A1* | 3/2006 | Saika | G06F 11/1451 |
| | | | 711/162 |
| 2006/0053262 A1 | 3/2006 | Prahlad et al. | |
| 2006/0100972 A1 | 5/2006 | Chianese et al. | |
| 2006/0253600 A1 | 11/2006 | Hannuksela | |
| 2007/0027937 A1 | 2/2007 | McGrattan et al. | |
| 2007/0162516 A1 | 7/2007 | Thiel et al. | |
| 2007/0250835 A1 | 10/2007 | Kobayashi et al. | |
| 2007/0276884 A1 | 11/2007 | Hara et al. | |
| 2007/0028853 A1 | 12/2007 | Romem et al. | |
| 2007/0288530 A1 | 12/2007 | Romem et al. | |
| 2008/0294696 A1 | 11/2008 | Frandzel | |
| 2009/0125362 A1 | 5/2009 | Reid et al. | |
| 2009/0238262 A1 | 9/2009 | Miceli | |
| 2009/0271605 A1 | 10/2009 | Park et al. | |
| 2009/0313447 A1* | 12/2009 | Nguyen | G06F 11/1451 |
| | | | 711/162 |
| 2010/0005259 A1 | 1/2010 | Prahlad et al. | |
| 2010/0257138 A1 | 10/2010 | Wang et al. | |
| 2010/0257140 A1 | 10/2010 | Davis et al. | |
| 2010/0262717 A1 | 10/2010 | Critchley et al. | |
| 2010/0274762 A1 | 10/2010 | Murphy et al. | |
| 2011/0141882 A1 | 6/2011 | Rieschl et al. | |
| 2011/0178985 A1 | 7/2011 | San Martin Arribas et al. | |
| 2011/0258239 A1 | 10/2011 | Petrocelli | |
| 2012/0166401 A1 | 6/2012 | Li et al. | |
| 2012/0209817 A1 | 8/2012 | Golab et al. | |
| 2012/0221715 A1 | 8/2012 | Hamada | |
| 2012/0250682 A1 | 10/2012 | Vincent et al. | |
| 2012/0265890 A1 | 10/2012 | Carlson et al. | |
| 2012/0303999 A1 | 11/2012 | Calder et al. | |
| 2012/0317274 A1 | 12/2012 | Richter et al. | |
| 2012/0317583 A1 | 12/2012 | Corbea et al. | |
| 2013/0018853 A1 | 1/2013 | Jayaraman et al. | |
| 2013/0073724 A1 | 3/2013 | Parashar et al. | |
| 2013/0124466 A1 | 5/2013 | Naidu et al. | |
| 2013/0124483 A1 | 5/2013 | Furuhashi et al. | |
| 2013/0132604 A1 | 5/2013 | Cohen et al. | |
| 2013/0151683 A1 | 6/2013 | Jain et al. | |
| 2013/0152047 A1 | 6/2013 | Moorthi et al. | |
| 2013/0166556 A1 | 6/2013 | Baeumges et al. | |
| 2013/0262388 A1 | 10/2013 | Sorenson et al. | |
| 2013/0290642 A1 | 10/2013 | Huang et al. | |
| 2013/0346366 A1 | 12/2013 | Ananthanarayanan et al. | |
| 2014/0019413 A1 | 1/2014 | Braam et al. | |
| 2014/0019421 A1 | 1/2014 | Jagadeesan | |
| 2014/0046906 A1 | 2/2014 | Patiejunas et al. | |
| 2014/0047263 A1 | 2/2014 | Coatney et al. | |
| 2014/0279905 A1 | 9/2014 | Muniswamy-Reddy et al. | |
| 2014/0324785 A1 | 10/2014 | Gupta et al. | |
| 2014/0358844 A1 | 12/2014 | Mundlapudi et al. | |

(56) References Cited

U.S. PATENT DOCUMENTS

2015/0172412 A1 6/2015 Escriva et al.
2016/0077744 A1 3/2016 Pundir et al.
2016/0077923 A1 3/2016 Zhang et al.

OTHER PUBLICATIONS

"Cloud Spanner: TrueTime and External Consistency", Retrieved from URL: https://cloud.google.com/spanner/docs/true-time-external-consistency on Feb. 28, 2018, pp. 1-6.
Randall Hunt, "Keeping Time with Amazon Time Sync Service", AWS News Blog, Retrieved the URL: https://aws.amazon.com/blogs/aws/keeping-time-with-amazon-time-sync-service on Feb. 28, 2018, pp. 1-3.
Barbara Liskov, "Practical Uses of Synchronized Clocks in Distributed Systems", ACM, copyright 1991 ACM, pp. 1-9.
James C. Corbrett, et al., "Spanner: Google's Globally-Distributed Database", Published in the Proceeding of OSDI 2012, 2012, pp. 1-14.
Friedemann Mattern, "Virtual Time and Global States of Distributed Systems", In the Proceedings of the International Workshop on Parallel and Distributed Algorithms, Oct. 1988, pp. 120-134.
U.S. Appl. No. 15/918,920, filed Mar. 12, 2018, Tate Andrew Certain, et al.
"Capturing Table Activity with DynamoDB Streams", dated Oct. 19, 2018, pp. 1-8.
Randall Hunt "New—Amazon DynamoDB Continuous Backups and Points-In-Time Recpvery", Mar. 26, 2018, pp. 1-9.
"Appendix E. Realese Notes", (PostgreSQL: Documentation: 10: E.144. Release 9.0.7), Oct. 19, 2018, pp. 1-4.
"PostgreSQL: The World's Most Advanced Open Source Relational Database", (https://www.postgresql.org), dated Oct. 19, 2018, pp. 1-10.
U.S. Appl. No. 14/977,472, filed Dec. 21, 2015, Akshat Vig.
U.S. Appl. No. 15/676,933, filed Aug. 14, 2017, Elizabeth Sanocki.
U.S. Appl. No. 15/728,271, filed Oct. 9, 2017, Pradeep Jnana Madhavarapu.
U.S. Appl. No. 14/977,453, filed Dec. 21, 2015, Yan Valerie Leshinsky.
U.S. Appl. No. 15/807,367, filed Nov. 8, 2017, Vaibhav Jain.
U.S. Appl. No. 15/920,207, filed Mar. 13, 2018, Akshat Vig.
U.S. Appl. No. 16/101,153, filed Aug. 10, 2018, Akshat Vig.
U.S. Appl. No. 15/920,193, filed Mar. 13, 2018, Akshat Vig.
U.S. Appl. No. 16/197,033, filed Nov. 20, 2018, Rachit Jain.
U.S. Appl. No. 16/231,109, filed Dec. 21, 2018, Grant Alexander MacDonald McAlister.
Amazon Web Services, "Amazon DynamoDB Developer Guide", API Version, Aug. 10, 2012, pp. 1-793.
Amazon Web Services, "Amazon DynamoDB Streams API Reference", API Version, Aug. 10, 2012, pp. 1-29.
U.S. Appl. No. 14/077,173, filed Nov. 11, 2013, Marvin Michael Theimer et al.
U.S. Appl. No. 14/077,171, filed Nov. 11, 2013, Marvin Michael Theimer et al.
U.S. Appl. No. 14/136,624, filed Dec. 20, 2013, Marvin Michael Theimer et al.
U.S. Appl. No. 14/136,645, filed Dec. 20, 2013, Marvin Michael Theimer et al.
U.S. Appl. No. 14/077,167, filed Nov. 11, 2013, Marvin Michael Theimer et al.
U.S. Appl. No. 14/077,162, filed Nov. 11, 2013, Marvin Michael Theimer et al.
U.S. Appl. No. 14/316,674, filed Jun. 26, 2014, Allan Henry Vermeulen et al.
U.S. Appl. No. 14/537,788, filed Nov. 10, 2014, Lei Ye et al.
International Search Report and Written Opinion From PCT/US2014/065057, dated Feb. 20, 2015, Amazon Technologies, Inc., pp. 1-13.
Alejandro Abdelnur, "Oozie Specification, a Hadoop Workflow System," Oct. 8, 2010, retrieved from http://rvs.github.com/oozie/release/2.2.1/WorkflowFunctionalSpec.html on Feb. 11, 2013, pp. 1-37.
Ani I Pillai and Alejandro Abdelnur, "Oozie Coordinator Specification," Oct. 8, 2010., retrieved from http://rvs.github.com/oozie/releases/2.2.1 /CoordinatorFunctionaiSpec.html on Feb. 11, 2013. pp. 1-43.
"Oozie—Design," retrieved from http://rvs.github.com/oozie/design.html on Feb. 11, 2013. pp. 1-2.
"Quartz Scheduler 2.1.x Documentation," retrieved from http://quartz-scheduler.org/files/documentation/Quartz-2.1.x-Documentation.pdfon Feb. 11, 2013. pp. 1-140.
Apache Kafka, "A High-Throughput Distributed Messaging System", pp. 1-42, Oct. 8, 2013.
Amazon Web Services, "Amazon Simple Queue Service (Amazon SQS)", pp. 1-5, Oct. 8, 2013.
Apache Software Foundation, "Hadoop Streaming", pp. 7-17, 2008.
SIGMOD Record, "Parallel Data Processing with MapReduce: A Survey", Kyong-Ha Lee, et al., pp. 11-20, Dec. 2011.
Splunk Inc., "Splunk for Application Management", pp. 1-2, 2012.
GitHub, "Rationale", pp. 1-2, Oct. 8, 2013.
GitHub, "Tutorial", pp. 1-8, Oct. 8, 2013.
U.S. Appl. No. 13/764,716, filed Feb. 11, 2013, Kathryn Marie Shih et al.
U.S. Appl. No. 13/764,711, filed Feb. 11, 2013, Kathryn Marie Shih et al.
U.S. Appl. No. 61/738,967, filed Dec. 18, 2012, Kathryn Marie Shih et al.
U.S. Appl. No. 13/465,944, filed May 7, 2012, Jonathan 8. Corley et al.
U.S. Appl. No. 13/465,978, filed May 7, 2012, Jonathan 8. Corley et al.
U.S. Appl. No. 13/476,987, filed May 21, 2012, Jacob Gabrielson et al.
Pierre Dorion, IBM Tivoli Storage Manager backup software tips, Apr. 2009, http://searchdatabackup.techtarget.com/tip/IBMTivoli-Storage-Manager-backup-software-tips.
Lascon, TSM Hints and Tips on Restores, Nov. 10, 2012, LasCon Storage, http://www.lascon.co.uk/tsm-restores.php.
International Search Report and Written Opinion from PCT/US14/65052, dated Feb. 20, 2015, Amazon Technologies, Inc., pp. 1-11.
U.S. Appl. No. 14/753,475, filed Jun. 29, 2015, Allan Henry Vermeulen, et al.
U.S. Appl. No. 14/753,484, filed Jun. 29, 2015, John Michael Morkel, et al.
U.S. Appl. No. 14/753,495, filed Jun. 29, 2015, Timothy Daniel Cole, et al.
U.S. Appl. No. 14/753,505, filed Jun. 29, 2015, Allan Henry Vermeulen, et al.
U.S. Appl. No. 14/482,668, filed Sep. 10, 2014, Allan Henry Vermuelen.
U.S. Appl. No. 14/482,661, filed Sep. 10, 2014, Allan Henry Vermeulen.
U.S. Appl. No. 14/491,454, filed Sep. 19, 2014, Allan Henry Vermeulen.
U.S. Appl. No. 14/491,371, filed Sep. 19, 2014, Allan Henry Vermeulen.
U.S. Appl. No. 14/491,444, filed Sep. 19, 2014, Allan Henry Vermeulen.
U.S. Appl. No. 14/316,630, filed Jun. 26, 2014, Allan Henry Vermeulen.
U.S. Appl. No. 14/316,622, filed Jun. 26, 2014, Allan Henry Vermeulen.
U.S. Appl. No. 14/316,619, filed Jun. 26, 2014, Allan Henry Vermeulen.
U.S. Appl. No. 14/231,077, filed Mar. 31, 2014, Jacob A. Strauss.
U.S. Appl. No. 14/230,378, filed Mar. 31, 2011, Jacob A. Strauss.
Sergio Almeida, et al., "Chain Replication: a Causal + Consistent Datastore based on Chain Replication", Apr. 15-17, 2013, pp. 85-98.
Scott Lystig Fritchie, "Chain Replication in Theory and in Practice", Sep. 30, 2010, pp. 1-11.

(56) References Cited

OTHER PUBLICATIONS

Robbert Van Renesse, et al., "Chain Replication for Supporting High Throughput and Availability", 2004, pp. 91-104.
U.S. Appl. No. 16/231,109, filed Dec. 12, 2018, Grant Alexander MacDonald McAlister.
U.S. Appl. No. 15/717,606, filed Sep. 27, 2017, Vaibhav Jain.

* cited by examiner

EFFICIENT DATABASE SNAPSHOT GENERATION

BACKGROUND

Database backup systems require sufficient storage space for the database and the backups of partitions of the database. As databases get larger over time, storage space requirements for the backups may become exponentially larger when multiple backups are kept for various points-in-time. Taking full backups of a partition in the database in response to small changes to data of the partition results in using more storage space compared to the change in storage requirements due to the small changes.

Differential-based backup systems reduce the overall storage requirements by storing only the differences relative to a reference point, such as a snapshot. Over time, requests for point-in-time restoration of data becomes more costly or inefficient due to applying the differences to the reference point over longer periods of time. Change logs also have a cost associated when storing the change logs at a storage service. Over time, the change logs may cost more than they are worth in terms of utility. Performing operations, such as size calculations, on the change logs in an iterative manner may not be cost effective or computationally efficient.

Figure 1:
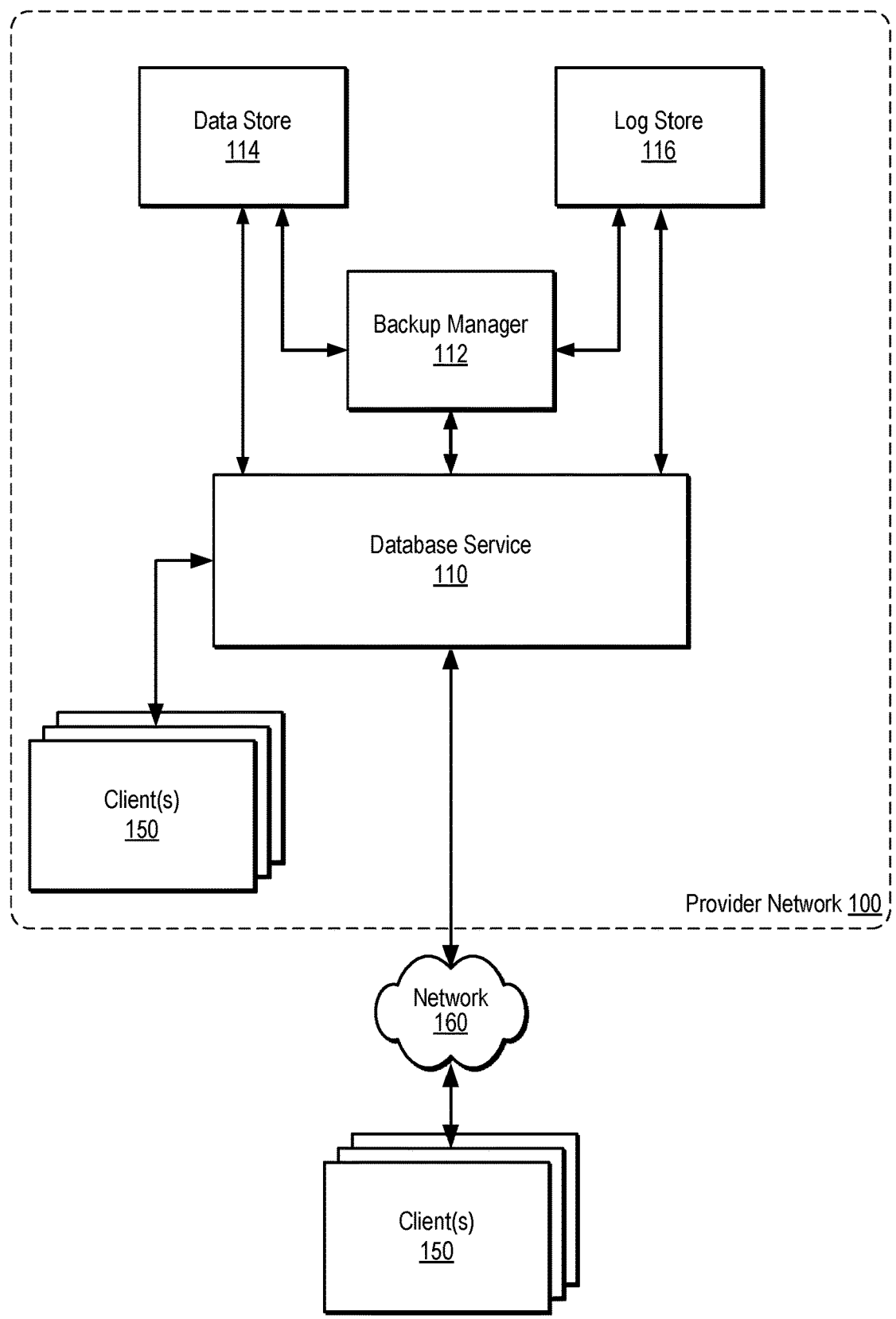
FIG. 1 is a logical block diagram illustrating a provider network that implements a database service, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of systems and processes that efficiently store backups of partitions of databases are described herein. In some embodiments, a system to manage database backups is disclosed. The system includes a database service to store a database and a log store to store a change log for one or more partitions of the database. The system includes one or more computing devices comprising one or more processors and a memory, the memory storing instructions that are executable by the one or more processors. The instructions cause the one or more processors to receive an indication to take a current snapshot of a partition of the database and determine, responsive to the indication to take the current snapshot of the partition of the database, a log size and operation type statistics for a portion of the change log for the partition, where the portion of the change log indicates changes to the partition since a previous snapshot. The instructions also cause the one or more processors to determine a snapshot type for the partition based at least in part on the log size and the operation type statistics, wherein the snapshot type specifies a log-based snapshot or a full snapshot. The instructions further cause the one or more processors to store the snapshot as metadata indicating a point in the change log if the determined snapshot type is log-based snapshot or store the snapshot as complete data of the partition if the determined snapshot type is full snapshot.

In other embodiments, a method is disclosed. The method includes determining, responsive to an indication to take a current snapshot of a partition of a database, a log size and operation type statistics for a portion of a change log for the partition, where the portion of the change log indicates changes to the partition since a previous snapshot. The method also includes determining a snapshot type for the partition based at least in part on the log size and the operation type statistics, where the snapshot type specifies a log-based snapshot or a full snapshot. The method further includes storing the snapshot as data indicating a point in the change log if the determined snapshot type is log-based snapshot or storing the snapshot as complete data of the partition if the determined snapshot type is full snapshot.

In another aspect, a non-transitory, computer-readable storage medium is also disclosed herein, according to some embodiments. The non-transitory, computer-readable storage medium stores instructions that, when executed by one or more processors, cause the one or more processors to determine, responsive to an indication to take a current snapshot of a partition of a database, a log size and operation type statistics for a portion of a change log for the partition, where the portion of the change log indicates changes to the partition since a previous snapshot. The instructions further cause the one or more processors to calculate a size of the change log. The instructions further cause the one or more processors to determine a snapshot type for the partition based at least in part on the log size and the operation type statistics, wherein the snapshot type specifies a log-based snapshot or a full snapshot. The instructions also cause the one or more processors to store the snapshot as data indicating a point in the change log if the determined snapshot type is log-based snapshot or store the snapshot as complete data of the partition if the determined snapshot type is full snapshot.

Various systems and methods of tracking a size of a database change log are described herein. A system is disclosed herein, according to some embodiments. The system includes a database service comprising a database and a log store to store a change log for the database. The system also includes one or more computing devices comprising one or more processors and a memory, the memory storing instructions that executable by the one or more processors. The instructions cause the one or more processors to receive an indication of a plurality of change events that have occurred at the database and generate a new log segment for the change log for the database based on the received indication, wherein the new log segment includes the plurality of change events. The instructions cause the one or more processors to add the new log segment to the change log. To add the new log segment to the change log, the instructions further cause the one or more processors to retrieve metadata for an end log segment of the change log to identify a cumulative size for the change log. The instructions cause the one or more processors to determine a new cumulative size for the change log based on a size of the new log segment and the identified cumulative size. The instructions cause the one or more processors to store the new log segment to the change log as a new end log segment with metadata indicating the new cumulative size for the change log.

A method is disclosed herein. The method includes generating a new log segment for a change log for a database, where the new log segment includes a plurality of change events that have occurred at the database. The method includes adding the new log segment to the change log. Said adding includes retrieving metadata for an end log segment of the change log to identify a cumulative size for the change log. The method also includes determining a new cumulative size for the change log based on a size of the new log segment and the identified cumulative size. The method further includes storing the new log segment to the change log as a new end log segment with metadata indicating the new cumulative size for the change log.

In other embodiments, a non-transitory, computer-readable storage medium storing computer-executable instructions is disclosed herein. The instructions cause the one or more processors to generate a new log segment for a change log for a database, wherein the new log segment includes a plurality of change events that have occurred at the database. The instructions cause the one or more processors to add the new log segment to the change log. To add the new log segment to the change log, the instructions further cause the one or more processors to retrieve metadata for an end log segment of the change log to identify a cumulative size for the change log. The instructions cause the one or more processors to determine a new cumulative size for the change log based on a size of the new log segment and the identified cumulative size. The instructions cause the one or more processors to store the new log segment to the change log as a new end log segment with metadata indicating the new cumulative size for the change log.

A method to generate a snapshot of a partition of a database is disclosed herein, according to some embodiments. The method includes receiving an indication to take a current snapshot of a partition of a database. The method includes determining a log size and operation type statistics for a portion of the change log for the partition. The method also includes determining a snapshot type based on the log size and the operation type statistics. After determining that the snapshot type is to be the log-based snapshot, the method includes storing the snapshot as data indicating a point in the change log. After determining that the snapshot type is to be the full backup, the method includes storing the snapshot as complete data of the partition.

A method to generate a full snapshot based on determining a source of the full snapshot is disclosed herein, according to some embodiments. The method includes determining to save a full snapshot of a database managed by a database service. The method also includes determining whether to generate the snapshot from the database service or from the change log. Based on a determination to generate the snapshot from the database service, the method includes sending a request to the database service retrieve complete data of the partition of the database. The method also includes generating the full snapshot from the complete data received from the database service. Based on a determination to generate the snapshot from the change log, the method includes retrieving a stored snapshot of the partition of the database from the data store. The method also includes applying a portion of the change log to the stored snapshot to generate the full snapshot. The method concludes by sending the full snapshot to the data store.

A method to determine a cumulative size of a log segment in a change log is disclosed herein, according to some embodiments. The method includes receiving an indication of change events that have occurred at a database. The method includes generating a new log segment for a change log for a database, where the new log segment includes the change events. The method also includes retrieving metadata of an end log segment of the change log to identify a cumulative size for the change log. The method also includes determining whether one or more portions of the new log segment are included in the change log. The method further includes removing the one or more portions that are included in the change log from the new log segment. The method includes determining a new cumulative size based on adding a size of the new log segment and the identified cumulative size. The method includes storing the new log segment as a new end log segment with metadata indicating the new cumulative size for the change log.

A method to determine a size of a portion of a change log is disclosed herein, according to some embodiments. The method includes receiving a request for a size of a portion of a change log in a specified range. The method also includes retrieving metadata for a range start log segment corresponding to a start point of the specified range to identify a preceding cumulative size. The method also includes retrieving metadata of a range end log segment corresponding to an end point of the specified range to identify a range end cumulative size. The method concludes by determining the size of the portion of the change log in the range by subtracting the previous cumulative size from the cumulative size.

A method to restore a point-in-time snapshot backup of a database is disclosed herein, according to some embodiments. The method includes receiving a request to restore a database to a state at a point-in-time. The method also includes retrieving a stored full snapshot of the partition of the database from a data store generated at a time near the point-in-time. The method further includes applying a change log to the stored snapshot to generate a restored database, where the change log was generated between generation of the stored snapshot and the point-in-time. The method concludes by restoring the database to the state at the point-in-time using the restored database.

FIG. 1 is a logical block diagram illustrating a provider network that implements a database service, according to some embodiments. Provider network 100 may be a private or closed system, in one embodiment, or may be set up by an entity such as a company or a public sector organization to provide one or more services (such as various types of cloud-based storage) accessible via the Internet and/or other networks to clients 150, in another embodiment. In one embodiment, provider network 100 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 100. In one embodiment, provider network 100 may implement various computing resources or services, such as a database service 110 or other data processing (e.g., relational or non-relational (NoSQL) database query engines, map reduce processing, data warehouse, data flow processing, and/or other large scale data processing techniques), data storage services (e.g., an object storage service, block-based storage service, or data storage service that may store different types of data for centralized access), virtual compute services, and/or any other type of network based services (which may include various other types of storage, processing, analysis, communication, event handling, visualization, and security services not illustrated).

In some embodiments, the provider network 100 may include a backup manager 112 configured to handle or manage backups of databases that are stored with or maintained by the database service 110. The backups may be maintained by one or more data storage services. In some embodiments, the data storage services may include a data store 114 and a log store 116. The data store 114 may be configured to store complete backups of partitions of the database at a particular point-in-time. For example, a particular snapshot stored at the data store 114 may be generated at a particular point-in-time such that the data in the particular snapshot is at the state in which the database existed at that particular point-in-time. In other embodiments, the database service 110 may be configured to store current or active data for the database such that data of the partition of the database is the most recent version of the data. The log store 116 may be configured to store logs indicating changes, mutations or events that occur with respect to the database or any data corresponding to the database managed by the database service 110.

In various embodiments, the components illustrated in FIG. 1 may be implemented directly within computer hardware, as instructions directly or indirectly executable by computer hardware (e.g., a microprocessor or computer system), or using a combination of these techniques. For example, the components of FIG. 1 may be implemented by a system that includes a number of computing nodes (or simply, nodes), in one embodiment, each of which may be similar to the computer system embodiment illustrated in FIG. 10 and described below. In one embodiment, the functionality of a given system or service component (e.g., a component of database service 110) may be implemented by a particular node or may be distributed across several nodes. In some embodiments, a given node may implement the functionality of more than one service system component (e.g., more than one data store component, such as data store 114 or log store 116).

Database service 110 may include various types of database services, in one embodiment, (both relational and non-relational) for storing, querying, and updating data. Such services may be enterprise-class database systems that are highly scalable and extensible. In one embodiment, queries may be directed to a database in database service 110 that is distributed across multiple physical resources (e.g., computing nodes or database nodes), and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service 110 may also be any of various types of data processing services to perform different functions (e.g., query or other processing engines to perform functions such as anomaly detection, machine learning, data lookup, or any other type of data processing operation). For example, in at least one embodiment, database service 110 may include a map reduce service that creates clusters of database nodes that implement map reduce functionality over data stored in one of data storage services (e.g., data store 114). Various other distributed processing architectures and techniques may be implemented by database service 110 (e.g., grid computing, sharding, distributed hashing, etc.) in another embodiment.

In one embodiment, clients 150 may encompass any type of client configurable to submit network-based requests to provider network 100 via network 160, including requests for database service 110 (e.g., to query a database managed by the database service 110) or data storage service(s) (e.g., a request to create, read, write, obtain, or modify data in data storage service(s), etc.). For example, in one embodiment a given client 150 may include a suitable version of a web browser, or may include a plug-in module or other type of code module configured to execute as an extension to or within an execution environment provided by a web browser. Alternatively, in a different embodiment, a client 150 may encompass an application such as a database application (or user interface thereof), a media application, an office application or any other application that may make use of storage resources in data storage service(s) to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 150 may be an application configured to interact directly with provider network 100, in one embodiment. In one embodiment, client 150 may be configured to generate network-based services requests according to a Representational State Transfer (REST)-style network-based services architecture, a document- or message-based network-based services architecture, or another suitable network-based services architecture.

In one embodiment, a client 150 may be configured to provide access to provider network 100 to other applications in a manner that is transparent to those applications. For example, client 150 may be configured to integrate with a database on database service 110. In such an embodiment, applications may not need to be modified to make use of the storage system service model. Instead, the details of interfacing to the database service 110 may be coordinated by client 150.

The clients 150 may communicate with the database service 110 from within the provider network 100, in some embodiments. For example, the clients 150 may be implemented on computing nodes of a computing service offered by the provider network 100. The clients 150 may convey network-based services requests to and receive responses from provider network 100 via network 160, in one embodiment. In one embodiment, network 160 may encompass any suitable combination of networking hardware and protocols necessary to establish network-based-based communications between clients 150 and provider network 100. For example, network 160 may encompass the various telecommunications networks and service providers that collectively implement the Internet. In one embodiment, network 160 may also include private networks such as local area networks (LANs) or wide area networks (WANs) as well as public or private wireless networks. For example, both a given client 150 and provider network 100 may be respectively provisioned within enterprises having their own internal networks. In such an embodiment, network 160 may include the hardware (e.g., modems, routers, switches, load balancers, proxy servers, etc.) and software (e.g., protocol stacks, accounting software, firewall/security software, etc.) necessary to establish a networking link between given client 150 and the Internet as well as between the Internet and provider network 100. It is noted that in one embodiment, clients 150 may communicate with provider network 100 using a private network rather than the public Internet.

The clients 150 may send a request to perform an operation to respective databases managed by the database service 110. For example, a given client 150 may send a PUT (or SET) command and corresponding data to request that the data be stored in the database at the data store 114. In another example, a given client 150 may send a CHANGE (or UPDATE) command and corresponding data to request that some data existing in the database at the data store 114 be changed based on the sent data. In yet another example, a given client 150 may send a DELETE (or REMOVE) command and identify data to request that the data existing in the database at the data store 114 be deleted or removed from the database and the data store 114. In other embodiments, a given client 150 may provide another command to perform some operation to the data stored in the database at the data store 114.

In some embodiments, responsive to the request to perform the operation, the database service 110 may direct an event to perform the operation causing one or more changes to data stored in a partition of the database. For example, the database service 110 may store new data in the partition of the database in response to the PUT command received from the given client 150. As another example, the database service 110 may change some data stored in the partition of the database in response to the CHANGE command received from the given client 150. As yet another example, the database service 110 may delete some data from the partition of the database in response to the DELETE command received from the given client 150.

The database service 110 may be configured to maintain a backup system for partitions of databases managed by the database service 110. In some embodiments, the backup system may perform backups for single partitions of the databases or single partition databases. In other embodiments, the backup system may perform backups for multiple partitions of the databases. The backup system may include a backup manager 112 configured to generate and manage backups or snapshots of partitions of the databases stored at in storage services of the database service 110. The backup manager 112 may generate a complete backup of a partition of the database (e.g., a snapshot) by saving a complete copy of the partition of the database to the data store 114. In some embodiments, the backup manager 112 may request a full snapshot from the database service 110. The snapshot may have parity with the partition of the database as it exists in the database service 110 at a respective time of creation. For example, at time $T_0$ when the snapshot is generated, the snapshot may be a complete or full copy of the partition of the database, such that the snapshot represents the state of the partition of the database at time $T_0$. As an example, at a later time $T_1$, the snapshot may be out-of-date based on one or more changes to the database resulting from one or more events at the database service 110. In some embodiments, the database service may have a high workload or otherwise be delayed in fulfilling the request for the full snapshot. Thus, the backup manager 112 may defer to a log-based snapshot as an alternative method to generate the full snapshot when the database service is determined to be unable to fulfill the request.

A change log may indicate the one or more changes to the database over a period of time or sequence of events. For example, the change log may indicate that data was added, changed or deleted from the database in a period of time. The change log may be stored at the log store 116. The log store 116 may be accessible to the database service 110 and the backup manager 112. In some embodiments, the database service 110 may generate or update a log segment in response to an event at the database. For example, the database service 110 may indicate in the log segment that the event occurred, and some data in the database has changed. The log segment may include metadata indicating a sequence start identifier, a sequence end identifier, a time start identifier, a time end identifier, one or more checksums, a previous cumulative size of the change log, a lineage of the log segment, or any combination thereof. The sequence start identifier may indicate a sequence number for a first event in a sequence of events that is logged in the log segment. The sequence end identifier may indicate a sequence number for a last event in the sequence of events that is logged in the log segment. The time start identifier may indicate a timestamp for the first event in the sequence of events that is logged in the log segment. The time end identifier may indicate a timestamp for the last event in the sequence of events that is logged in the log segment. The one or more checksums may correspond to the data in the partition of the database, the log segment, etc. The one or more checksums may be used by the backup manager 112 or the database service 110 to determine whether application of at least a portion of the log segment or the change log to the database has resulted in the correct data being restored or retrieved. The previous cumulative size of the change log may indicate a size of the change log prior to the respective log segment. The lineage of the log segment may indicate parent or child partitions associated with the log segment.

The log segment may be added to the change log at the log store 114 in response to satisfying one or more criteria. In some embodiments, the log segment may be added to the change log based on a determination that the log segment satisfies a size threshold. For example, the database service 110 may add events to the log segment continuously until the log segment reaches a specified size or a size limit. After the log segment is the specified size, the log segment may be committed to the change log at the log store 114. In other embodiments, the log segment may be added to the change log based on a determination that a number of operations tracked or identified in the log segment satisfies a threshold number of operations. For example, the database service 110 may perform multiple CHANGE operations to the database. The multiple CHANGE operations on a data entry may require a higher amount of storage space in the log segment despite the storage space used by the data entry has not significantly increased. The database service 110 may track a number of operations and corresponding types and save the number of operations and corresponding types to the log segment.

The database service 110 may receive an indication that an event has occurred with a partition of a given database managed by the database service 110. In some embodiments, the event may be based on a request to perform an operation sent from a given client 150 to the database service 110. For example, the event may be based on a PUT command, a CHANGE command, a DELETE command or any other type of request from the given client 150. The event may also indicate a type of the operation, such as PUT, CHANGE, DELETE, etc. The event may also indicate data that used to perform the operation. For example, the indicated data may include new data to be stored with the PUT command, changed data to be updated with the CHANGE command, data to be deleted with the DELETE command.

The database service 110 may generate a log segment based on the event. For example, the database service 110 may tabulate or track one or more changes resulting from the event and save them to the log segment. The database service 110 may track a size of the log segment. In some embodiments, the database service 110 may track a size of the change log. The database service 110 may retrieve metadata from an end log segment of the change log to identify a cumulative size for the change log. The database service 110 may determine a new cumulative size of the change log based on adding the tracked size of the log segment with the identified cumulative size of the change log. The new cumulative size may be included in metadata for the log segment. In some embodiments, the log segment may be sent or committed to the change log at the log store 116 based on satisfying a log segment size threshold. For example, the log segment may be committed to the change log after reaching a maximum size limit.

The clients 150 may send a request to the database service 110 to generate a backup of a partition of a database. The database service 110 may also implement timed, periodic backups automatically or after scheduling by the clients 150. In some embodiments, a backup of the partition the database (e.g., a snapshot) may be generated at least in part by the backup manager 112. The backup manager 112 may have access to the database stored at the database service 110, the data store 114 and the log store 116.

The backup manager 112 may determine whether to generate the snapshot based on a log size for the change log at the log store 116 satisfying a size threshold. For example, the backup manager 112 may determine to generate the snapshot when the change log reaches a size limit such that the change log reaches a maximum allowable size. The maximum allowable size may be set in order to reduce overall computation time or costs associated with maintaining the change log. The backup manager 112 may also determine whether to generate the snapshot in response to a request from the client 150. The backup manager 112 may yet also determine whether to generate the snapshot based on a timed request or a periodic schedule.

The backup manager 112 may calculate the size of the change log by tracking the size over time, during generation of log segments of the change log. In some embodiments, the backup manager 112 may store a current size of a log segment to metadata for the log segment. The backup manager 112 may further track a current cumulative size of the change log, including the log segment. In some embodiments, the backup manager 112 may iteratively traverse the change log to calculate the size of the change log.

In other embodiments, the backup manager 112 may examine or analyze metadata for a log segment to determine that the log segment and preceding log segments have a given size. For example, the metadata for the log segment may indicate a running sum of the size of the change log. Tracking the running sum of the size may increase subsequent size calculations by having an entry in the metadata that is easily referenced compared to traversing the change log. A first log segment may indicate a total size for the first log segment in corresponding metadata. A second log segment may indicate a cumulative size including a size for the second log segment added to the size of the first log segment. In a non-limiting example, the first log segment may have a size of 10 units, and the second log segment may have a size of 15 units, so the cumulative size in the metadata for the second log segment may be set to 25 units (i.e., the sum of 10 and 15 units). In an example, when generating a third log segment, the backup manager 112 may analyze the metadata for the second log segment to determine that the change log has a cumulative sum of 25 units (e.g., a previous cumulative sum). The backup manager 112 may then add a size of the third log segment (e.g., 20 units) to the previous cumulative sum (25 units) to calculate the current cumulative sum (45 units). The backup manager 112 may write the current cumulative sum to metadata for the third log segment. The backup manager 112 may store or commit the third log segment and corresponding metadata to the log store 116. In some embodiments, the metadata may indicate sequence numbers that represent numbers of operations that have been performed on the database. The sequence numbers may be tracked by the backup manager 112 as an estimate for the size of the change log, in some embodiments.

The backup system 112 may reduce storage usage at the log store 116 by removing redundant or duplicate entries in log segments or the change log. In some situations, the change log may be tracking multiple partitions that may be logged asynchronously. Some of the partitions may be duplicative of other partitions with an offset in logging. For example, partitions of the database may be managed asynchronously thus causing the offset. In some embodiments, the backup system 112 may determine that a log segment contains one or more portions that are also included in one or more previous log segments based on a previous cumulative size and a sequence start identifier for the log segment. For example, the log segment may have a sequence start identifier of 40, and a most recent, previous log segment may indicate that there are 45 entries already stored. The backup manager 112 may delete or remove entries 40-45 of the log segment to avoid duplicating logs that have already been committed to the log store 116.

The database service 110 may receive a request for a cumulative size of a range of operations. In some embodiments, the database service 110 may determine the cumulative size of the range by identifying a starting log segment corresponding to a start point of the range. For example, the range may indicate a starting sequence number that may be used to identify a log segment in the change log at the log store 116. The database service 110 may analyze metadata for the starting log segment to determine a preceding cumulative size of preceding log segments. In some embodiments, the preceding cumulative size may be an entry in the metadata for the starting log segment. The database service 110 may identify an ending log segment corresponding to an end point of the range. The database service 110 may analyze metadata for the ending log segment to determine an ending cumulative size of the change log that includes the preceding log segments and the range. The database service 110 may calculate the cumulative size of the range by subtracting the preceding cumulative size from the ending cumulative size.

To generate the snapshot of a partition of the database, the backup manager 112 may determine a snapshot type or method to generate the snapshot. In some embodiments, the backup manager 112 may determine the snapshot type based on a log size of the change log or operation type statistics for the change log. For example, the backup manager 112 may determine to request a full snapshot from the database service 110 based on a determination that the change log satisfies a size threshold, such as a maximum size limit, in order to more efficiently generate the full snapshot. In other embodiments, the backup manager 112 may determine the snapshot type based on operation type statistics including a number of performed operation types indicated in the change log. For example, the change log may indicate a large number of CHANGE operations such that numerous modifications of data have occurred over time on the same data entries. In this example, a full snapshot may be more cost effective in terms of storage costs and computational usage costs because repeatedly modifying data with the change logs may result in redundant or wasted computations by overwriting data multiple times while generating the snapshot. In another example, the change log may indicate a large number of PUT operations such that numerous new data entries are included in the change log. In this example, a log-based snapshot or a differential-based snapshot may be more cost effective because requesting a full snapshot from the database service 112 may cause the database service 112 to provide data that has not significantly changed in addition to the new data entries. In another example, the operation type statistics may include a relative percentage of performed operation types that is relative to other performed operation types. As another example, the operation type statistics may include a ratio of performed operation types that is relative to other performed operation types. In yet another example, the operation type statistics may include a percentage of performed operation types as a percentage of the cumulative size of the change log.

The backup manager 112 may determine that the snapshot type is a full snapshot to generate a full snapshot based on a current state of the partition(s) of the database as it stored at the database service 110. In some embodiments, the snapshot may be stored as complete data of the partition(s). The backup manager 112 may send a request to the database service 110 for the full snapshot. The database service 110 may provide and send the full snapshot to the backup manager 112. The backup manager 112 may store the full snapshot to the data store 114.

In another example, the backup manager 112 may determine that the snapshot type is a log-based snapshot. The backup manager 112 may generate data that indicates a point in the change log that, when used in conjunction with a stored snapshot, may be used to represent a snapshot of the partition of the database. The backup manager 112 may store the generated data as metadata in the data store 114.

In some embodiments, the log-based snapshot may be used to generate a full snapshot based on applying at least a portion the change log to a stored snapshot. The log-based snapshot may indicate the portion of the change log that may include logged events that have occurred since generation of the stored snapshot through the current time. The backup manager 112 may retrieve the stored snapshot from the data store 114, such as by sending a request to the data store 114 for the previous snapshot. The backup manager 112 may retrieve the change log from the log store 116, such as by sending a request to the log store 116 for the change log. The backup manager 112 may be configured to apply the change log to the stored snapshot. In some embodiments, applying the change log to the stored snapshot includes starting with the stored snapshot and stepping through the change log and reenacting events included in the change log in chronological order to the stored snapshot. In other embodiments, applying the change log to the stored snapshot includes starting with the stored snapshot and stepping through the change log and undoing events included in the change log in reverse chronological order.

Figure 2:
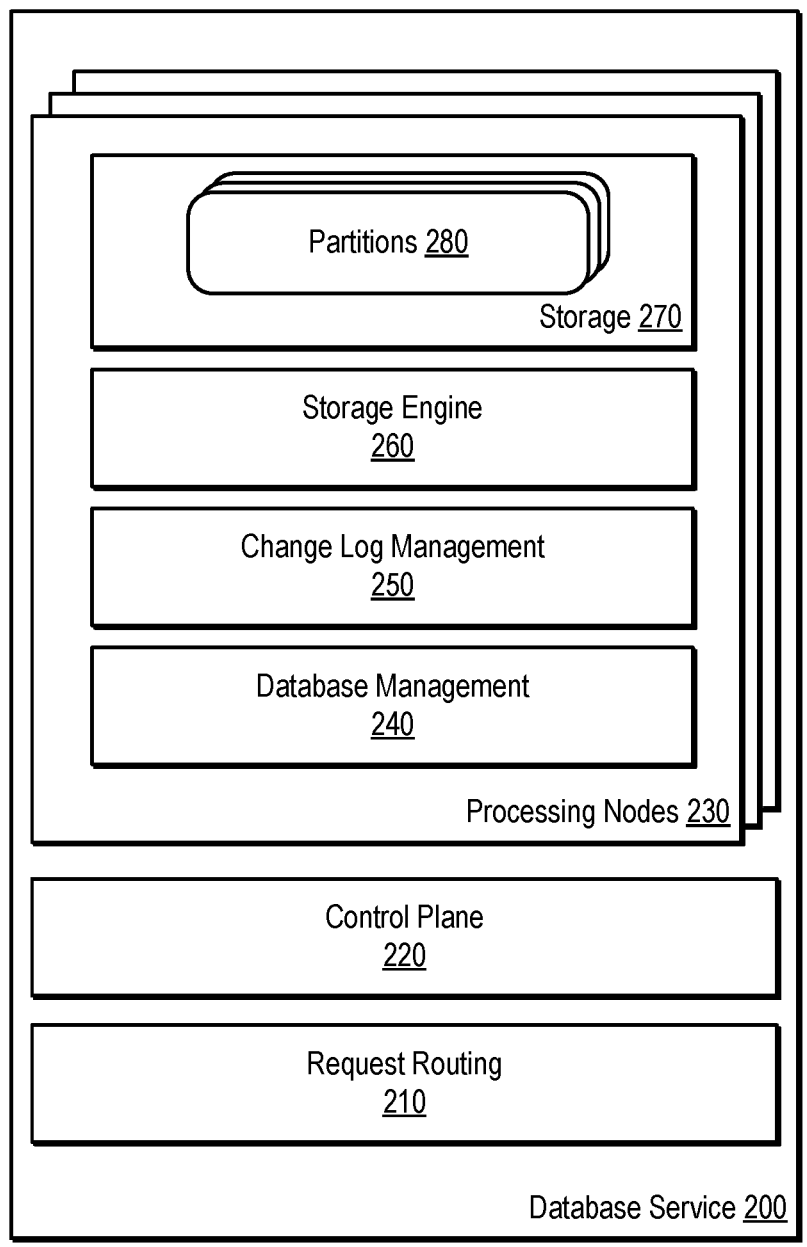
FIG. 2 is a logical block diagram illustrating a database service that may implement database backup management, according to some embodiments.

FIG. 2 is a logical block diagram illustrating a database service that may implement database backup management, according to some embodiments. Database service 200 may correspond to the database service 110 of FIG. 1. Database service 200 may implement request routing 210, in one embodiment. Request routing may be configured to receive, authenticate, parse, throttle and/or dispatch service requests, among other things, in one embodiment. In one embodiment, database service 200 may implement control plane 220 to implement one or more administrative components, such as automated admin instances which may be configured to provide a variety of visibility and/or control functions, as described in more detail herein). In one embodiment, database service 200 may also implement a plurality of database nodes 230, each of which may manage one or more partitions 280 of a data set (e.g., a database) on behalf of clients/users or on behalf of the data storage service (and its underlying system) which may be stored in internal storage 270 (on storage devices attached to database nodes 230) or, in another embodiment, one or more partitions 290 in external storage 280 which may be accessed by database nodes 230 (e.g., via network connections).

Control plane 220 may provide visibility and control to system administrators, detect split events for database nodes, and/or anomaly control, resource allocation, in one embodiment. In one embodiment, control plane 220 may also include an admin console, through which system administrators may interact with the data storage service (and/or the underlying system). In one embodiment, the admin console may be the primary point of visibility and control for the data storage service (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as split requests to be processed, at storage service 270, in one embodiment.

Control plane 220 may be configured to direct the performance of different types of control plane operations among the nodes, systems, or devices implementing database service 200, in one embodiment. For instance, control plane 220 may be configured to communicate with database nodes to initiate the performance of various control plane operations, such as moves, splits, update tables, delete tables, create indexes, etc. In one embodiment, control plane 220 may be configured to update a task registry (or some other table or data structure) with the status, state, or performance information of the control plane operations currently being performed. Control plane 220 may detect, direct, or otherwise instigate different partition movement operations.

In one embodiment, request routing 210 may support handling requests formatted according to an interface to support different types of web services requests. For example, in one embodiments, database service 200 may be configured to implement a particular web services application programming interface (API) that supports a variety of operations on tables (or other data objects) that are maintained and managed on behalf of clients/users by the data storage service system (and/or data stored in those tables). In one embodiment, database service 200 may be configured to support different types of web services requests. For example, in one embodiments, database service 200 may be configured to implement a particular web services application programming interface (API) that supports a variety of operations on tables (or other data objects) that are maintained and managed on behalf of clients/users by the data storage service system (and/or data stored in those tables). In one embodiment, request routing 210 may perform parsing and/or throttling of service requests, authentication and/or metering of service requests, dispatching service requests, and/or maintaining a partition assignments that map database nodes to partitions.

Database nodes 230 may implement database management 240, in one embodiment. Database management 240 may create, update, define, query, and/or otherwise administer databases, in one embodiment. For instance, database management 240 may maintain a database according to a database model (e.g., a relational or non-relational database model). In one embodiment, database management 240 may allow a client to manage data definitions (e.g., Data Definition Language (DDL) requests to describe column definitions, requests to add item attributes, etc.). In one embodiment, database management 240 may handle requests to access the data (e.g., to insert, modify, add, or delete data as well as requests to query for data by generating query execution plans to determine which partitions of a database may need to be evaluated or searched in order to service the query). In one embodiment, database management 240 may also perform other management functions, such as enforcing access controls or permissions, concurrency control, or recovery operations. In one embodiment, database management 240 may send requests to storage engine 260 to access partitions 280 in order to process access requests (e.g., requests to read or scan different partitions or particular items or parts of data within a partition).

Database nodes 230 may implement change log management 250, in some embodiments. Change log management 250 may create, update, define, query, and/or otherwise administer change logs associated with databases, according to some embodiments. In some embodiments, change log management 250 may track events occurring at a database managed by the database service 220. For example, change log management 250 may generate change logs based on the events and send the change logs to a storage service (e.g., the log store 116 of FIG. 1). Change log management 250 may monitor changes at storage engine 260 and generate change logs per partition of partitions 280.

In one embodiment, database nodes 230 may implement storage engine 260 to access either internal storage and/or external storage 270. Storage engine 260 may perform requests on behalf of database management to create, read, update and delete (CRUD) data in a partition, in one embodiment. Storage engine 260 may implement buffers, caches, or other storage components to reduce the number of times storage is accessed, in one embodiment. Storage engine 260 may implement various storage interfaces to access storage 270. For example, in those embodiments where external storage is a network-based data storage service, like another data storage service in provider network 100 in FIG. 1, then storage engine 260 may be configured to establish a network connection with the service as part of obtaining access to a storage unit (e.g., by submit requests formatted according to a protocol or API to establish the connection). In another embodiment, storage engine 260 may access internal storage using storage protocols (e.g., Small Computer Systems Interface (SCSI)) over a bus or other interconnect that directly connects a host implementing storage engine 260 with internal storage 270).

In one embodiment, database service 200 may provide functionality for creating, accessing, and/or managing tables processed at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 2. Note also that in one embodiment, one or more database nodes 230 process access requests on behalf of clients directed to tables. Some of these database nodes may operate as if they were in a multi-tenant environment, and others may operate as if they were in a single-tenant environment. In some embodiments, database nodes 230 that operate as in a multi-tenant environment may be implemented on different database nodes (or on different virtual machines executing on a single host) than database nodes that operate as in a single-tenant environment. In some embodiments, database nodes 230 may operate as a stand-alone database environment.

Figure 3A:
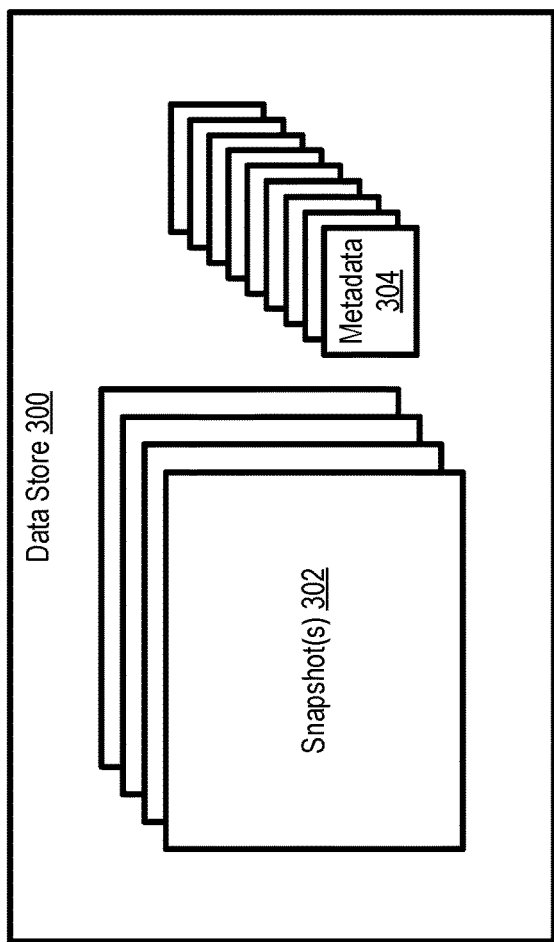
FIG. 3a is a block diagram illustrating a data store configured to store snapshots of databases, according to some embodiments.

FIG. 3a is a block diagram illustrating a data store configured to store snapshots of databases, according to some embodiments. A data store 300 may store snapshots 302 for a database managed by the database service 110 of FIG. 1 or the database service 200 of FIG. 2. The data store 300 may correspond to the data store 114 of FIG. 1.

The snapshots 302 may include full snapshots of partitions of the database such that all data of partitions of the database at a point-in-time is kept as a backup in the snapshots 302. The data store 300 may also store metadata 304 for log-based snapshots. For example, the metadata 304 may identify one or more portions of a change log at the log store 116 of FIG. 1. The metadata 304 may indicate points in the change log that, when combined with a snapshot 302, may assist in generation of a new snapshot. In some embodiments, the metadata 304 may identify points-in-time corresponding to a sequence number for events that occurred at the database. The metadata 304 may be generated by a database service to improve data access times to backup data stored at the data store 300.

Figure 3B:
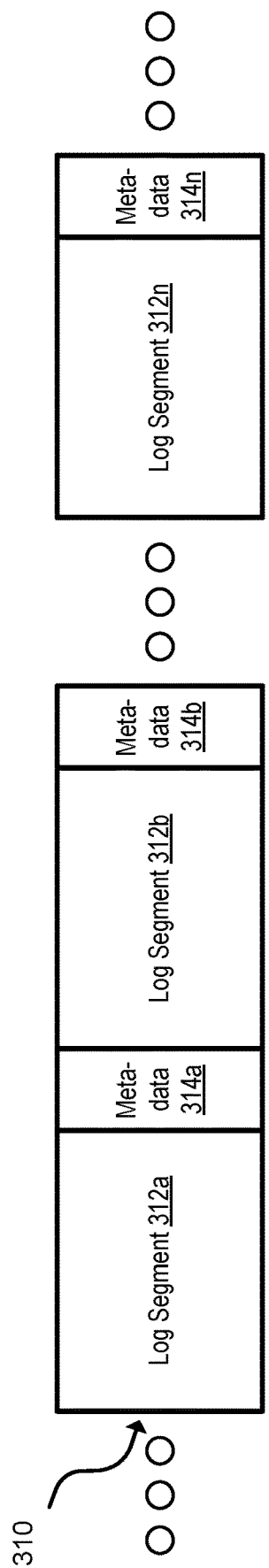
FIG. 3b is a block diagram illustrating a change log, according to some embodiments.

FIG. 3b is a block diagram illustrating a change log, according to some embodiments. A change log 310 may be stored at or retrieved from the log store 116 of FIG. 1. The log segments 312a, 312b . . . 312n may be generated by a backup manager 112 or a database service 110. The log segments 312a, 312b . . . 312n may store logs that correspond to operations performed on a database managed by a database service.

The change log 310 may include metadata 314a, 314b . . . 314n that is associated with respective log segments 312a, 312b . . . 312n. For example, metadata 314a may indicate a size of log segment 312a. Metadata 314b may indicate a cumulative size of log segment 314b and log segment 312a. Metadata 314n may indicate a cumulative size of log segment 312a, 314b and any other log segments generated between log segment 314b and 314n. Metadata 314a, 314b . . . 314n may also indicate a sequence start identifier, a sequence end identifier, a time start identifier, a time end identifier, one or more checksums, a previous cumulative size of the change log, a lineage of the new log segment, or any combination thereof, for respective log segments 312a, 312b . . . 312n.

Figure 4:
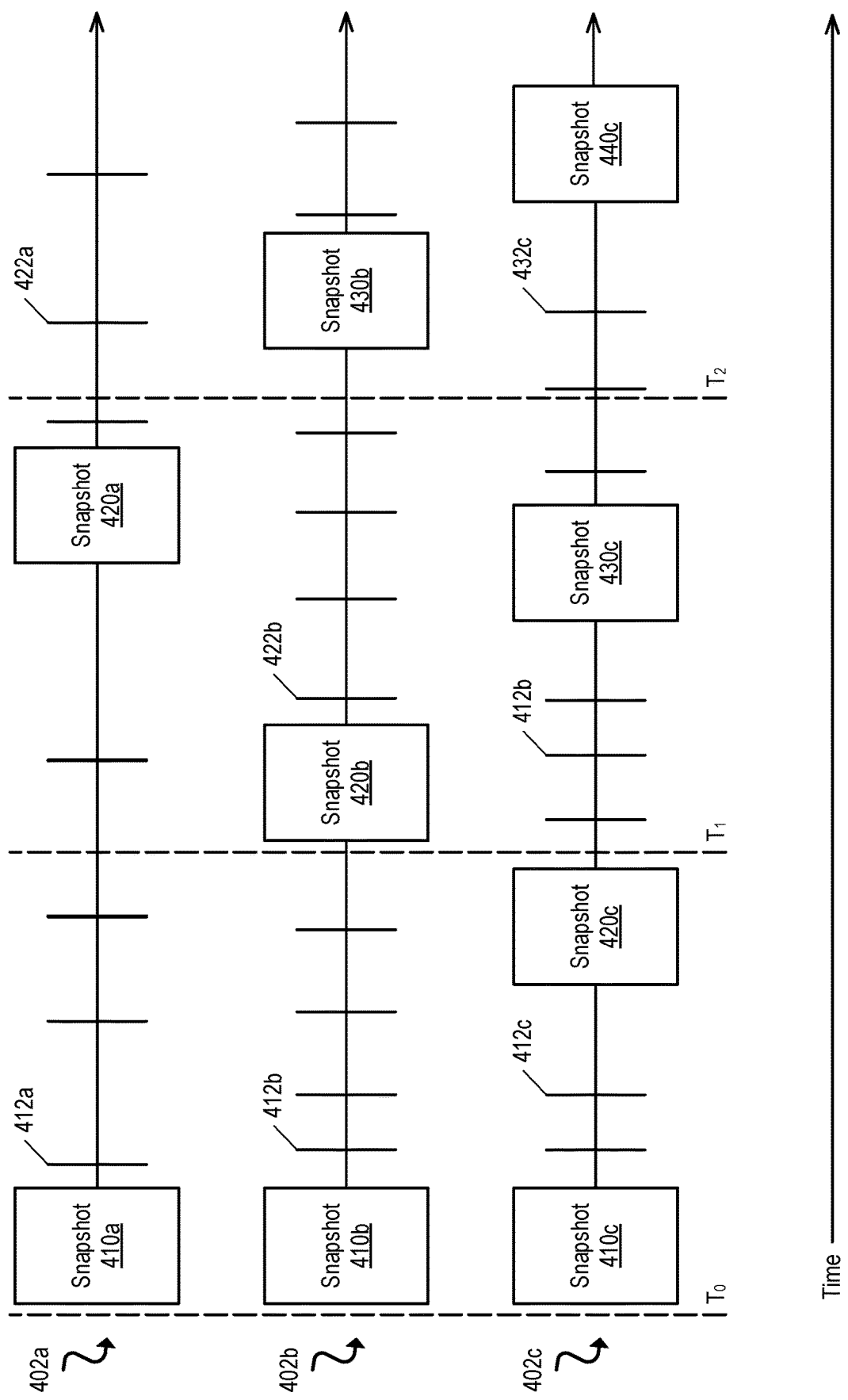
FIG. 4 is a timeline diagram illustrating snapshots and log-based snapshots over time, according to some embodiments.

FIG. 4 is a timeline diagram illustrating snapshots and log-based snapshots over time for multiple partitions of a database service, according to some embodiments. Timelines 402a, 402b and 402c are intended to be examples and non-limiting. The timelines 402a, 402b and 402c may correspond to different partitions of database service. The database service may correspond to the database service 110 of FIG. 1 or the database service 200 of FIG. 2.

As an illustrative example, at To, snapshots 410a, 410b and 410c may be generated from respective partitions of the database, as described herein. As events occur at respective partitions, one or more log-based snapshots 412a, 412b and 412c are generated by a backup manager (e.g., the backup manager 112 of FIG. 1), as described herein. A second snapshots 420a, 420b and 420c may be generated based on retrieving a full snapshot from the database service or based on applying change logs to respective previous snapshots 410a, 410b and 410c, as described herein. The second snapshots 420a, 420b and 420c may also have corresponding log-based snapshots 422a, 422b and 422c. As additional events occur, additional snapshots 430b and 440c may be generated.

A client may request a point-in-time restoration of a snapshot. For example, the client may request a restoration for time $T_1$. For the partitions represented by timelines 402a and 402b, the database service may retrieve a most recent log-based snapshots 412a and 412b closest to $T_1$. For the partition represented by timeline 402c, the database service may retrieve snapshot 420c. In some embodiments, the database service may retrieve a previous snapshot and apply at least a portion of the change log to achieve more precision in the state of the partition at the point-of-time. For example, the database service may have access to a log-based snapshot 412a that may be generated one or more events prior to the requested time $T_1$. Thus, the database service may apply a portion of the change log that includes events occurring between the preceding log-based snapshot and $T_1$.

A client may also request a backup be performed at $T_2$. The backup manager may determine whether to apply change logs to stored snapshots or generate a full snapshot from the database service, as described herein. As an illustrative example, for the partition represented by timeline 402a, the backup manager may determine to generate a log-based backup based in part on $T_2$ being relatively close in time to generation of the snapshot 420a. As another illustrative example, for the partition represented by 402b, the backup manager may determine to generate a full backup based in part on the change log since generation of the snapshot 420b being relative large or satisfying a size threshold.

Figure 5:
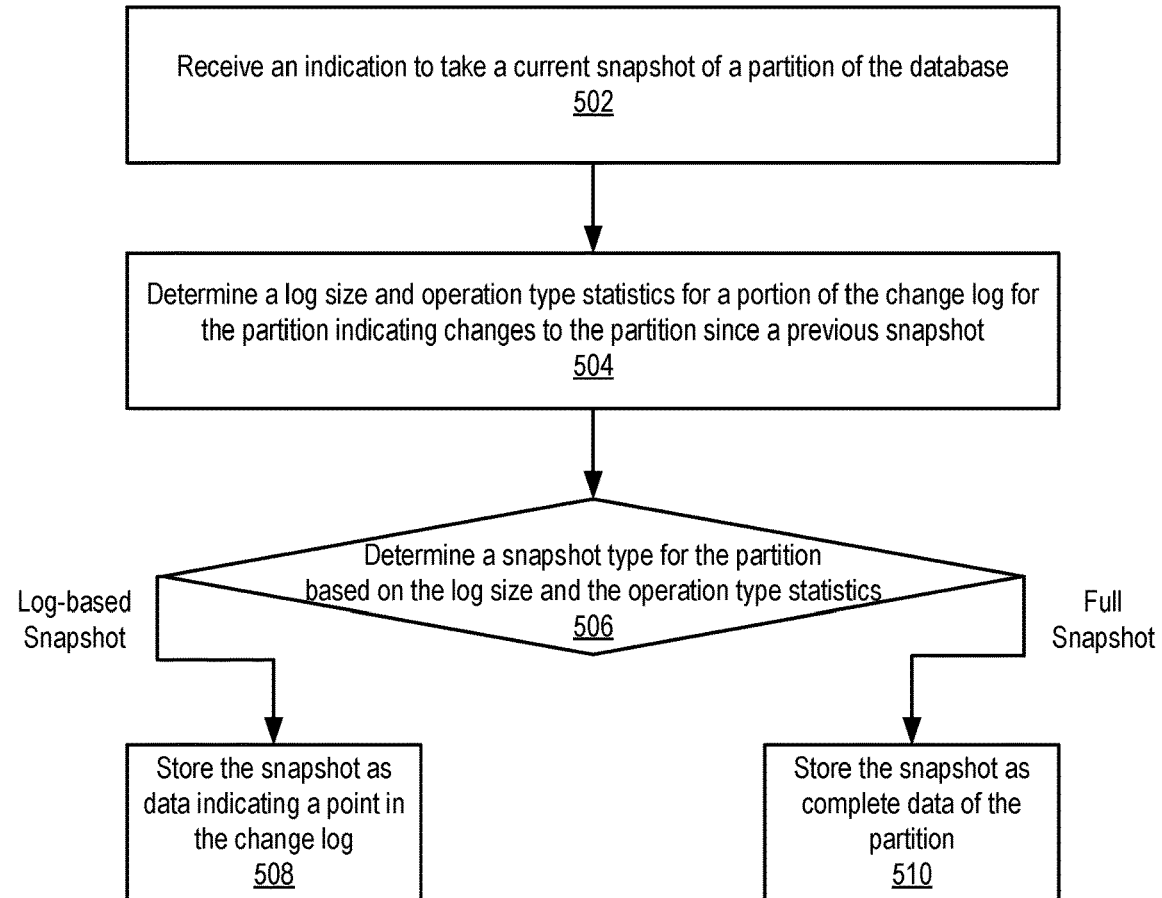
FIG. 5 is a flowchart diagram illustrating a method to generate a snapshot of a database, according to some embodiments.

FIG. 5 is a flowchart diagram illustrating a method 500 to generate a snapshot of a partition of a database, according to some embodiments. In some embodiments, the method 500 may be implemented at a provider network by a backup manager for a database service. The provider network may correspond to the provider network 100 of FIG. 1, in some embodiments. The backup manager may correspond to the backup manager 112 of FIG. 1, in some embodiments. The database service may correspond to the database service 110 of FIG. 1 or the database service 200 of FIG. 2, in some embodiments.

The method 500 includes receiving an indication to take a current snapshot of a partition of a database, at 502. In some embodiments, the partition of the database may be a single partition that includes the database as a whole. In some embodiments, the indication to take the current snapshot may be a request to take the current snapshot. In some embodiments, the indication may be provided in response to a client request. For example, a client may send the client request to take the current snapshot on-demand. In other embodiments, the indication may be provided based on a schedule to take snapshots of the partition. For example, the client may set up a schedule to periodically take snapshots of the partition. In another example, the database service may periodically instruct the backup manager to take snapshots of partitions of the database.

The method 500 includes determining a log size and operation type statistics for a portion of the change log for the partition, at 504. The change log may be stored at a log store, such as the log store 116 of FIG. 1. In some embodiments, the portion of the change log for the partition may indicate changes to the partition that have occurred since a previous snapshot was generated. For example, the portion of the change log may include indications of events at the database and results of the events. In some embodiments, the cumulative size may be calculated by iteratively traversing the change log and tabulating the size. In other embodiments, the cumulative size may be calculated faster by analyzing metadata of a log segment of the change log to identify the cumulative size of the change log. The metadata of the log segment may have a field indicating the cumulative size of the change log up to and including the log segment. In some embodiments, the operation type statistics may indicate one or more operation types for operations performed as part of the events at the database. For example, the operation type statistics may indicate that a number of create operations, a number of change operations, a number of update operations or a number of delete operations, or any combination thereof has been performed as part of the events.

The method 500 also includes determining a snapshot type based on the log size and the operation type statistics, at 506. The snapshot type may correspond to a method or procedure for the backup manager to generate the snapshot or a backup of the database. For example, the snapshot type may correspond to a full snapshot backup. In another example, the snapshot type may correspond to a log-based snapshot backup. In some embodiments, the snapshot type may be determined based on the log size satisfying a size threshold. For example, the log size may satisfy the size threshold when the log size is larger than a size indicated by the size threshold. In another example, the log size may satisfy the size threshold when the log size reaches a maximum size limit. As a non-limiting example, the snapshot type may specify the full snapshot based on the log size being larger than the size indicated by the size threshold. In some embodiments, the snapshot type may be determined based on the operation type statistics indicating that one operation type was performed more than another operation type. In a non-limiting example, the snapshot type may specify the log-based snapshot based on the operation type statistics indicating that more create operations were performed than update operations. In another non-limiting example, the snapshot type may specify the full snapshot based on the operation type statistics indicating that more update operations were performed than create operations.

After determining that the snapshot type is to be the log-based snapshot, the method 500 includes storing the snapshot as data indicating a point in the change log, at 508. In some embodiments, the data may be metadata stored at the data store. In other embodiments, the data may indicate a sequence identifier or a timestamp to identify the point in the change log. After determining that the snapshot type is to be the full backup, the method 500 includes storing the snapshot as complete data of the partition, at 510. In some embodiments, storing the snapshot as complete data may include requesting a copy of the partition from the database service. In other embodiments, storing the snapshot as complete data may include generating a snapshot based on applying a portion of the change log to a stored snapshot, as described with respect to FIG. 6 below.

Figure 6:
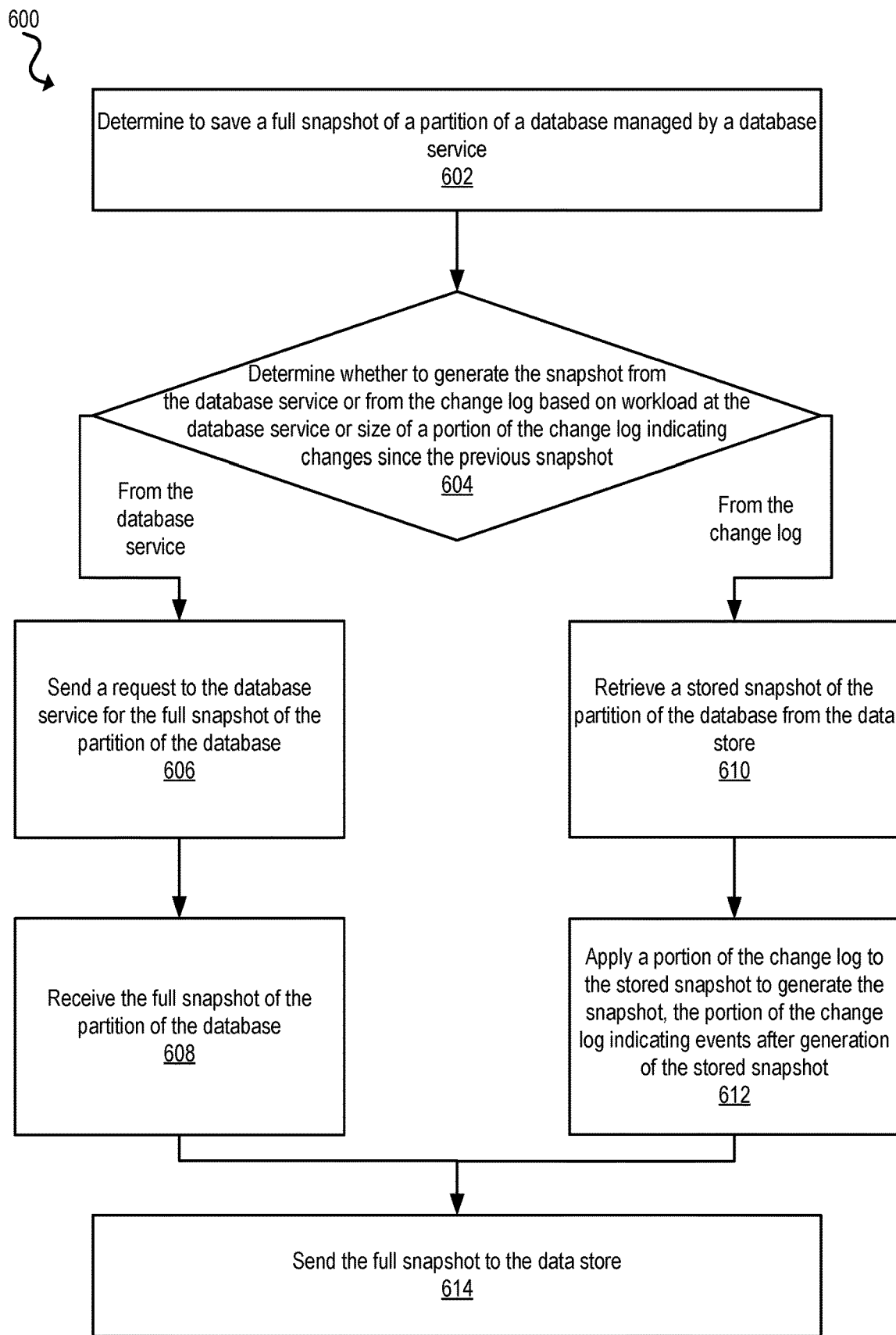
FIG. 6 is a flowchart diagram illustrating a method to generate a snapshot based on determining a snapshot type, according to some embodiments.

FIG. 6 is a flowchart diagram illustrating a method 600 to generate a full snapshot based on determining a source of the full snapshot, according to some embodiments. The method 600 may be performed by a backup manager, such as the backup manager 112 of FIG. 1, in some embodiments.

The method 600 includes determining to save a full snapshot of a database managed by a database service, at 602. The database service may correspond to the database service 110 of FIG. 1 or the database service 200 of FIG. 2. In some embodiments, the determining to save the full snapshot may be a result of determining the snapshot type, as described with respect to step 506 of the method 500 of FIG. 5.

The method 600 also includes determining whether to generate the snapshot from the database service or from the change log, at 604. In some embodiments, the determination may be based on workload at the database service or size of a portion of the change log indicating changes since the previous snapshot, at 604. For example, the backup manager may determine to generate the snapshot from the database service based on a log size or operation type statistics of the change log, as described herein such as steps 504 and 506 of FIG. 5. In another example, the backup manager may determine to generate the snapshot from the change log based on a determination that the database service has a high workload such that the database service is too busy to provide the full snapshot upon request.

Based on a determination to generate the snapshot from the database service, the method 600 includes sending a request to the database service to retrieve complete data of the partition of the database, at 606. In some embodiments, the database service may have full access to the database and send a snapshot or a backup copy or complete data of the partition of the database to the backup manager or a data store configured to store snapshots of databases. The method 600 also includes generating the full snapshot from the complete data received from the database service, at 608. In some embodiments, the backup manager may be configured to adapt or modify the complete data to conform to a format or standard of a snapshot.

Based on a determination to generate the snapshot from the change log, the method 600 includes retrieving a stored snapshot of the database from the data store, at 610. In some embodiments, the backup manager may send a request for the stored snapshot to the data store. In other embodiments, the backup manager may access the data store directly to retrieve the stored snapshot. The stored snapshot may be a full snapshot at a specific point-in-time such that the previous snapshot includes a complete copy of the database at that specific point-in-time. The method 600 also includes applying a portion of the change log to the stored snapshot to generate the full snapshot, at 612. The portion of the change log may correspond to events that have occurred after creation or generation of the stored snapshot. In some embodiments, applying the portion of the change log may include starting with the stored snapshot and implementing the events to the stored snapshot included in the portion of the change log. For example, the stored snapshot may be iteratively modified in the order in which events occurred as indicated in the portion of the change log.

The method 600 concludes by sending the full snapshot to the data store, at 614. The data store may correspond to the data store 114 of FIG. 1, according to some embodiments. In other embodiments, the full snapshot may be sent to another destination, such as a client requesting the full snapshot.

Figure 7:
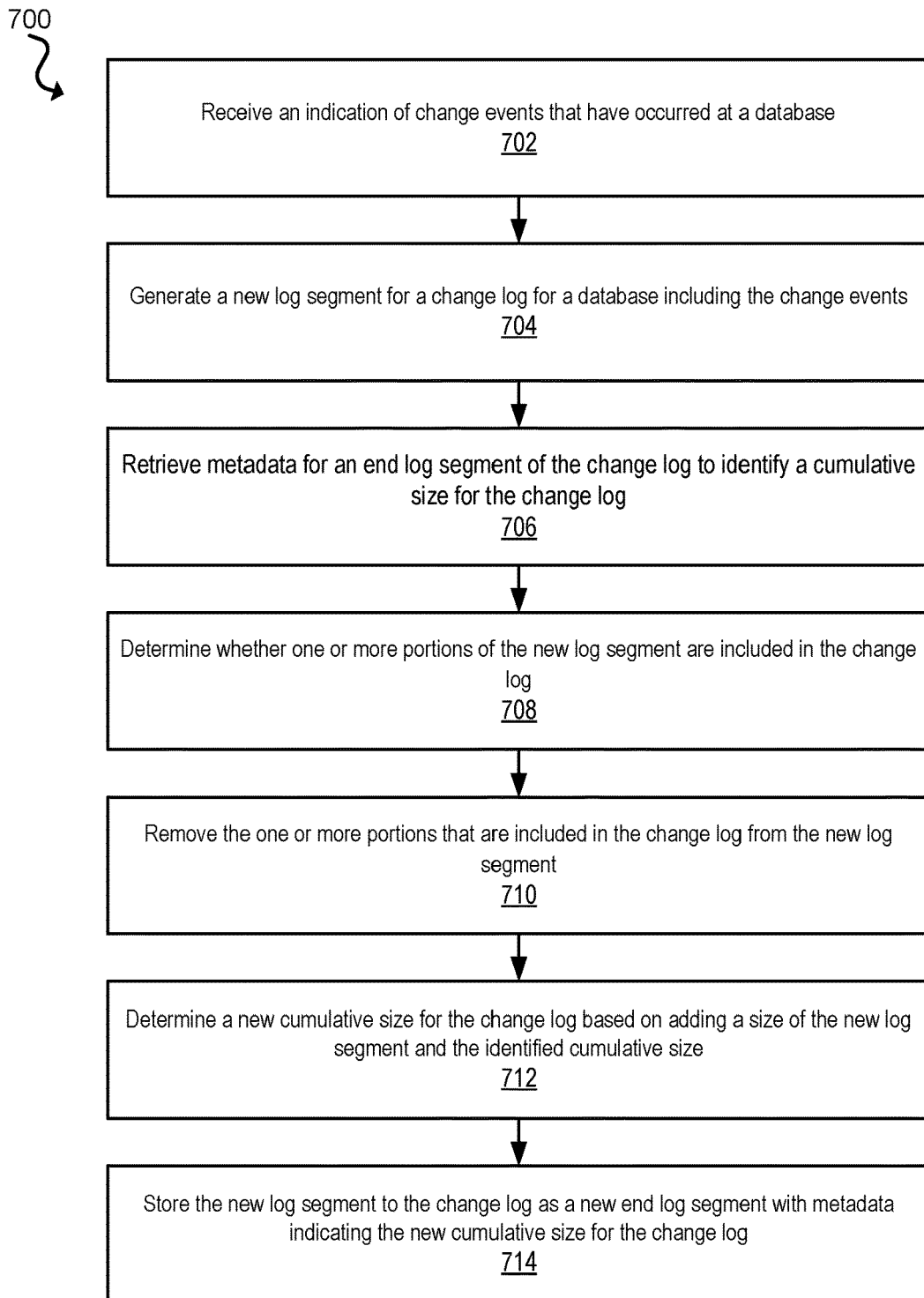
FIG. 7 is a flowchart diagram illustrating a method to determine a cumulative size of a log segment in a change log, according to some embodiments.

FIG. 7 is a flowchart diagram illustrating a method 700 to determine a cumulative size of a log segment in a change log, according to some embodiments. The method 700 may be performed by a backup manager, such as the backup manager 112 of FIG. 1.

The method 700 includes receiving an indication of change events that have occurred at a database, at 702. The database may be managed by a database service, such as the database service 110 of FIG. 1 or the database service 200 of FIG. 2. The operations may include create, read, write or delete operations that affect data entries of the database.

The method 700 includes generating a new log segment for a change log for a database, where the new log segment includes the change events, at 704. In some embodiments, the backup manager may maintain the log segment as a portion of a change log configured to track events occurring at the database. For example, the log segment may indicate an event occurred at a specified time or has a specified sequence number indicating a relative time or position in a sequence of events in the log segment.

The method 700 also includes retrieving metadata of an end log segment of the change log to identify a cumulative size for the change log, at 706. In some embodiments, the end log segment may correspond to a most recently generated log segment of the change log. In some embodiments, the metadata for given log segments includes information that indicates a cumulative size of the change log up to a given log segment, as described herein, such as step 504 of FIG. 5 or step 604 of FIG. 6. The cumulative size may indicate a size of all preceding log segments to show a current running total of the size of the change log. By storing the cumulative size as metadata in the log segment, computation time is reduced by utilizing a lookup or read function in the metadata rather than iteratively calculating the size of the change log.

The method 700 also includes determining whether one or more portions of the new log segment are included in the change log, at 708. In some embodiments, the cumulative size may indicate that a certain number of events in a sequence have been logged in the change log. A start identifier of the new log segment may indicate that the portion of the new log segment may have been already logged in the change log. For example, the previous cumulative size may indicate that records 0-20 have been logged, and the start identifier may indicate that the portion of the new log segment begins at record 15. Thus, in this example, there will be the portion of the log segment that is included in the previous log segments.

The method 700 further includes removing the one or more portions that are included in the change log from the new log segment, at 710. In continuing the previous example, the portion of the log segment begins at record 15, such that at least records 15-20 of the log segment are duplicative or redundant in the change log. Thus, records 15-20 will be removed or deleted from the log segment to prevent redundant entries in the change log.

The method 700 includes determining a new cumulative size based on adding a size of the new log segment and the identified cumulative size, at 712. In some embodiments, the backup manager may continuously track the size of the log segment in order to increase computation speed when determining the size of the log segment. In some embodiments, utilizing simple addition of the size of the log segment and the previous cumulative size may significantly reduce computation time and costs associated with calculating the size of the change log.

The method 700 includes storing the new log segment as a new end log segment with metadata indicating the new cumulative size for the change log, at 714. In some embodiments, the new log segment may be stored to a log store. The log store may correspond to the log store 116 of FIG. 1, in some embodiments. The metadata may be included in the log segment. The metadata may be stored at the log store in conjunction with but not included in the log segment. In other embodiments, the metadata may be stored in a metadata store.

Figure 8:
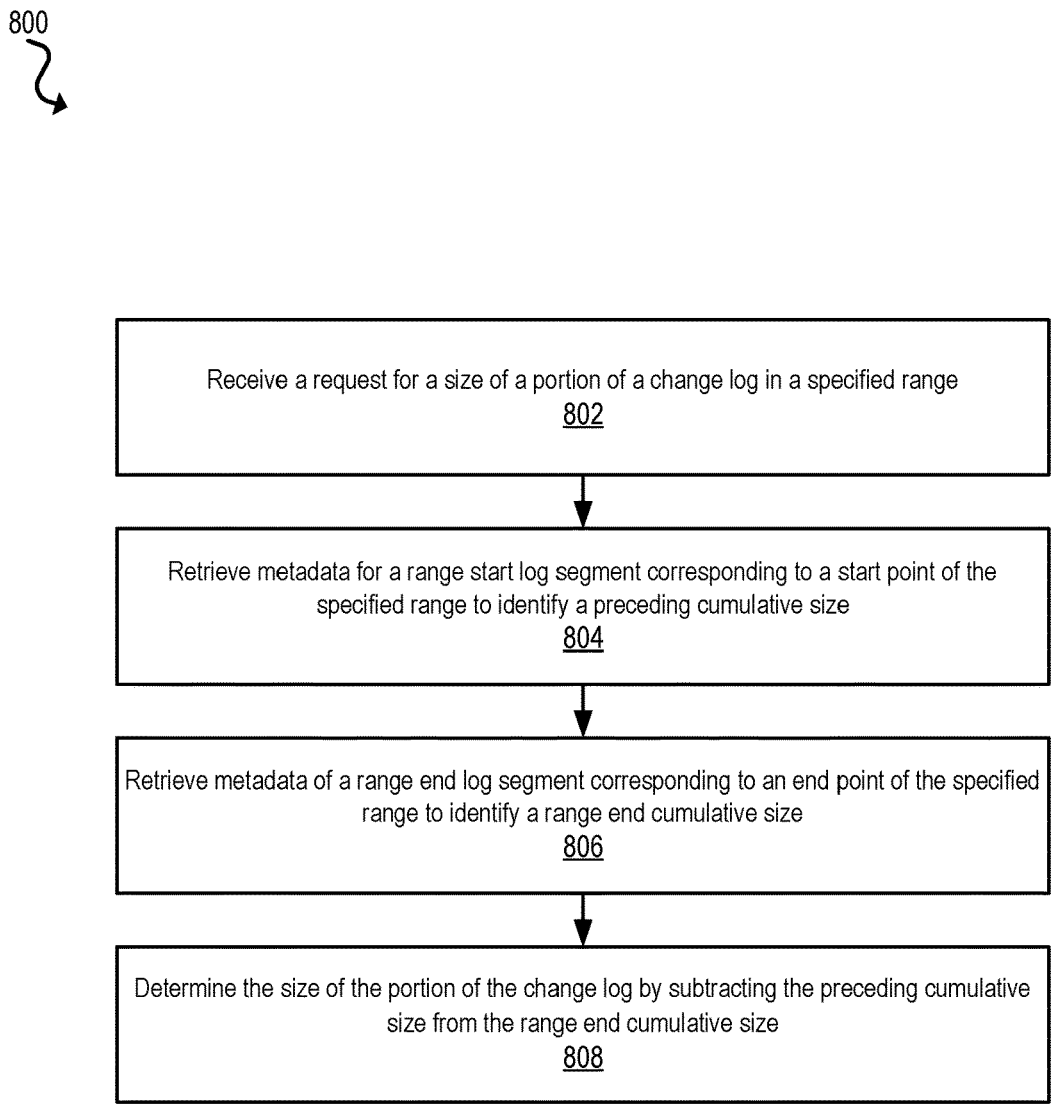
FIG. 8 is a flowchart diagram illustrating a method to determine a size of a portion of a change log, according to some embodiments.

FIG. 8 is a flowchart diagram illustrating a method 800 to determine a size of a portion of a change log, according to some embodiments. The method 800 may be performed at a backup manager, such as the backup manager 112 of FIG. 1, in some embodiments. The method 800 may also be performed at a log store, such as the log store 116 of FIG. 1, in some embodiments. The method 800 may also be performed at a database service, such as the database service 110 of FIG. 1, in some embodiments. In some embodiments, the change log may be stored at a log store, such as the log store 116 of FIG. 1.

The method 800 includes receiving a request for a size of a portion of a change log in a specified range, at 802. In some embodiments, the database service may receive a request for the size of the portion from a client, such as clients 150 of FIG. 1. The request may be formed in accordance with an application programming interface (API) that allows the client to request sizes for a specific block of the change log. Alternatively, the database service may request the size of the portion in order to determine storage usage of the change lock within that portion. For example, the database service may determine that the portion of the change log uses in order to process business-related transactions or service level agreements. The specified range may include a start point and an end point.

The method 800 also includes retrieving metadata for a range start log segment corresponding to a start point of the specified range to identify a preceding cumulative size, at 804. The preceding cumulative size may correspond to a cumulative size of the change log through the range start log segment. In some embodiments, the log segment at the start point is identified by a starting sequence number that may be used to identify the log segment in the change log. In some embodiments, the starting sequence number may indicate an event within a log segment. Thus, to identify a location, the method may also include interpolating a size of the log segment based on a relative sequence number within that log segment. In some embodiments, the metadata includes an entry that indicates the previous cumulative size, as described herein.

The method 800 also includes retrieving metadata of a range end log segment corresponding to an end point of the specified range to identify a range end cumulative size, at 806. In some embodiments, the metadata includes an entry that indicates the cumulative size that includes the previous portion of the change log and the log segment at the end point. As described herein, the cumulative size indicated in the metadata for a given log segment may include a running total of the size of the change log up through the given log segment.

The method 800 concludes by determining the size of the portion of the change log in the range by subtracting the previous cumulative size from the cumulative size, at 808. In some embodiments, subtracting the numerical values of the previous cumulative size from the cumulative size may increase computation speed and reduce computation time and costs.

Figure 9:
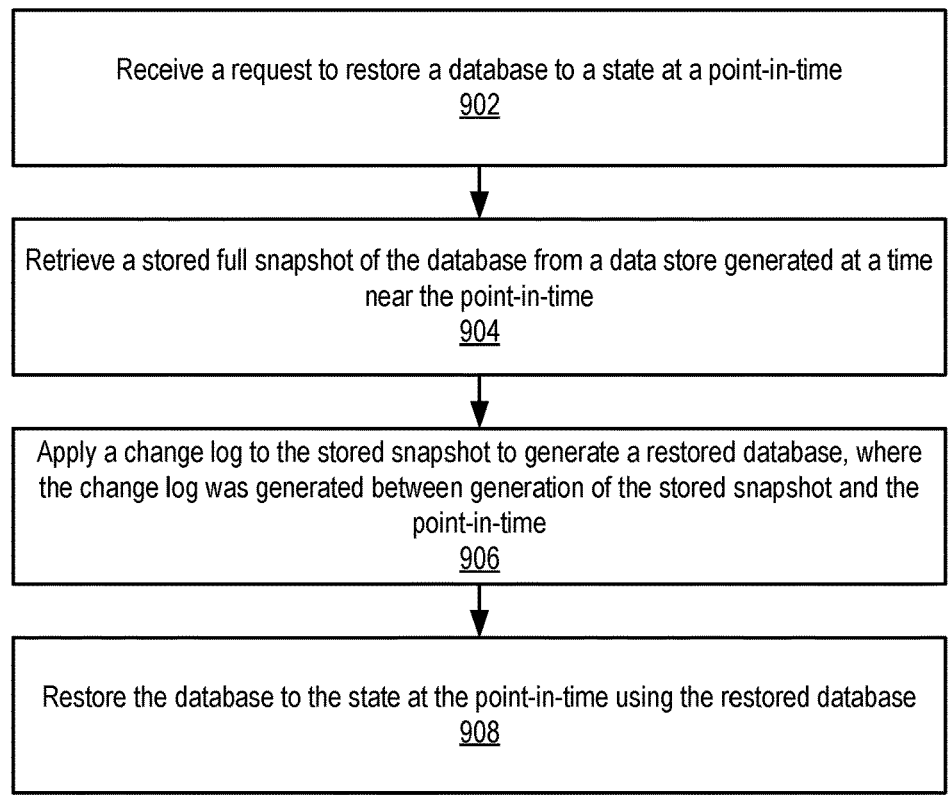
FIG. 9 is a flowchart diagram illustrating a method to restore a point-in-time snapshot backup of a database, according to some embodiments.

FIG. 9 is a flowchart diagram illustrating a method 900 to restore a point-in-time snapshot backup of a database, according to some embodiments. The database may be managed by a database service, such as the database service 110 of FIG. 1 or the database service 200 of FIG. 2. The method 900 may be implemented by the database service, in some embodiments.

The method 900 includes receiving a request to restore a database to a state at a point-in-time, at 902. In some embodiments, a client, such as the clients 150 of FIG. 1, may send the request to restore the database. In other embodiments, the database service 110 may determine that the database stored at one or more partitions 280 of a storage service, such as partitions 280 of storage service 270 of FIG. 2, may have become corrupt or unusable.

The method 900 also includes retrieving a stored full snapshot of the database from a data store generated at a time near the point-in-time, at 904. The data store may correspond to the data store 114 of FIG. 1. In some embodiments, the stored full snapshot may not be a most recent snapshot of the database. For example, one or more operations may have occurred at the database since generation of the stored full snapshot. In some embodiments, the stored full snapshot may be a full snapshot that is generated most recently to the point-in-time. For example, the stored full snapshot may be a most recent full snapshot with respect to the point-in time. In another example, the stored full snapshot may be a The method 900 further includes applying a change log to the stored snapshot to generate a restored database, where the change log was generated between generation of the stored snapshot and the point-in-time, at 906. In some embodiments, the change log may be identified based on a sequence identifier corresponding to a sequence of events at the database. In some embodiments, the metadata of the stored snapshot may indicate a sequence identifier that identifies the point-in-time in which the snapshot was generated. In some embodiments, applying the change log to the stored snapshot includes starting with the stored snapshot and stepping through the change log and reenacting events included in the change log in chronological order to the stored snapshot. In other embodiments, applying the change log to the stored snapshot includes starting with the stored snapshot and stepping through the change log and undoing events included in the change log in reverse chronological order.

The method 900 concludes by restoring the database to the state at the point-in-time using the restored database, at 908. In some embodiments, the database may be restored at the data store. In other embodiments, the database may be sent to the client in response to an on-demand restoration operation.

Figure 10:
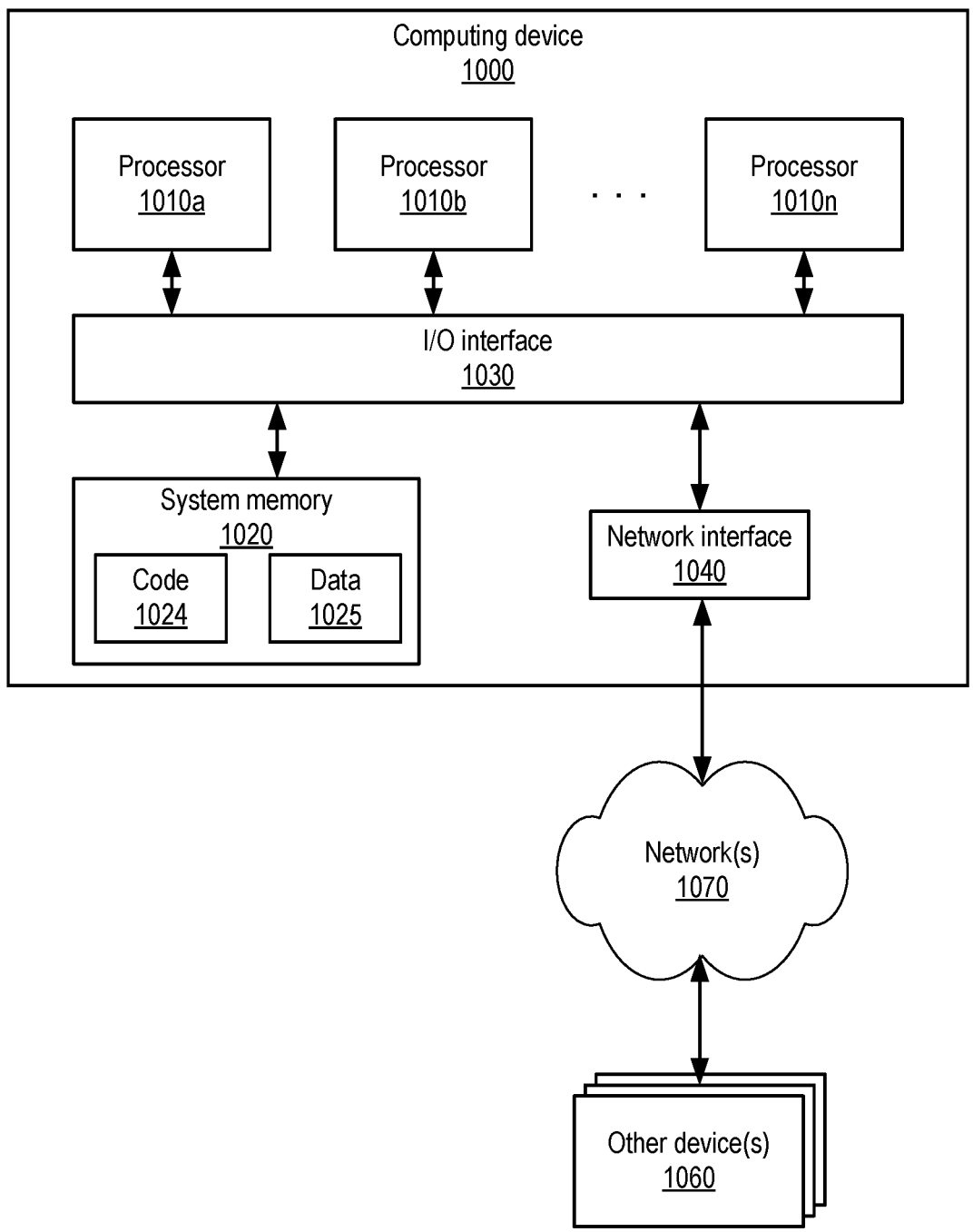
FIG. 10 is a block diagram illustrating an example computer system that may be used in some embodiments.

Any of various computer systems may be configured to implement techniques for tracking a count of a number of items in a data store, as disclosed herein. For example, FIG. 10 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 1000 such as that illustrated in FIG. 10 or one or more components of the computer system 1000 that function in a same or similar way as described for the computer system 1000.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In some embodiments, computer system 1000 may be illustrative of servers implementing enterprise logic or downloadable application, while in other embodiments servers may include more, fewer, or different elements than computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be embedded processors implementing any of a variety of instruction set architectures (ISAs), such as the x106, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor 1010. In various embodiments, system memory 1020 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the tracking of a count of a number of items in a data store are shown stored within system memory 1020 as program instructions 1024. In some embodiments, system memory 1020 may include data 1025 which may be configured as described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as between client devices (e.g., 1060, clients 150, etc.) and other computer systems, or among hosts, for example. In particular, network interface 1040 may be configured to allow communication between computer system 1000 and/or various other device 1060 (e.g., I/O devices). Other devices 1060 may include scanning devices, display devices, input devices and/or other communication devices, as described herein. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1000 via I/O interface 1030. A computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, which may be implemented via network interface 1040.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 1000, including one or more processors 1010 and various other devices (though in some embodiments, a computer system 1000 implementing an I/O device 1050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1000. In general, an I/O device (e.g., cursor control device, keyboard, or display(s) may be any device that can communicate with elements of computing system 1000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
 a database service to store a database;
 a log store to store a change log for one or more partitions of the database;
 one or more computing devices comprising one or more processors and a memory, the memory storing instructions that, when executed by the one or more processors, cause the one or more processors to:
  receive an indication to take a current snapshot of a partition of the database;
  determine, responsive to the indication to take the current snapshot of the partition of the database, a log size and operation type statistics for a portion of the change log for the partition, wherein the portion of the change log indicates changes to the partition since a previous snapshot;
  determine a snapshot type for the partition based at least in part on the log size and the operation type statistics, wherein the snapshot type specifies a log-based snapshot or a full snapshot; and
  store, to a data store, the snapshot as metadata indicating a point in the change log if the determined snapshot type is log-based snapshot or store, to the data store, the snapshot as complete data of the partition if the determined snapshot type is full snapshot.

2. The system of claim 1, wherein the determined snapshot type is log-based snapshot, wherein to store the snapshot as metadata the instructions further cause the one or more processors to:
 determine the point in the change log based at least in part on a sequence indicator corresponding to an event in the change log;
 generate the metadata indicating the point in the change log; and
 store the metadata to the data store.

3. The system of claim 1, wherein the determined snapshot type is full snapshot, wherein the instructions further cause the one or more processors to:
 determine whether to generate the full snapshot from the database service or from the change log based at least in part on the log size and workload at a database service;
 based on a determination to generate the full snapshot from the database service:
  send, to the database service, a request to retrieve the complete data of the partition; and
  generate the full snapshot from the complete data received from the database service;
 based on a determination to generate the full snapshot from the change log:
  retrieve a stored full snapshot of the partition of the database from a data store; and
  apply the portion of the change log to the stored full snapshot to generate the full snapshot; and
 send the full snapshot to the data store.

4. The system of claim 1, wherein the operation type statistics indicate a quantity of one or more operation types that are logged in the portion of the change log, wherein the one or more operation types comprise a write operation, an update operation, a delete operation, or any combination thereof.

5. The system of claim 1, wherein to determine the snapshot type the instructions further cause the one or more processors to:
 determine whether the log size of the change log satisfies a size threshold; and
 determine, based on the operation type statistics, whether a number of performed operations of a first operation type is greater than a number of performed operations of a second operation type.

6. A method, comprising:
 determining, responsive to an indication to take a current snapshot of a partition of a database, a log size and operation type statistics for a portion of a change log for the partition, wherein the portion of the change log indicates changes to the partition since a previous snapshot;
 determining a snapshot type for the partition based at least in part on the log size and the operation type statistics, wherein the snapshot type specifies a log-based snapshot or a full snapshot; and
 storing the snapshot as data indicating a point in the change log if the determined snapshot type is log-based snapshot or storing the snapshot as complete data of the partition if the determined snapshot type is full snapshot.

7. The method of claim 6, further comprising:
in response to the determined snapshot type being full snapshot, determining whether to generate the full snapshot from the database service or from the change log based at least in part on the log size and workload at a database service.

8. The method of claim 7, wherein based at least in part on a determination to generate the full snapshot from the database service, storing the snapshot as complete data comprises:
sending, to the database service, a request to retrieve the complete data of the partition;
generate the full snapshot from the complete data received from the database service; and
sending the full snapshot to a data store.

9. The method of claim 8, further comprising deleting the portion of the change log from the log store after sending the full snapshot to the data store.

10. The method of claim 7, wherein based at least in part on a determination to generate the full snapshot from the change log, storing the snapshot as complete data comprises:
retrieving a stored full snapshot of the partition of the database from a data store;
applying the portion of the change log to the stored full snapshot to generate the full snapshot; and
sending the full snapshot to the data store.

11. The method of claim 6, wherein storing the snapshot as data indicating the point in the change log comprises:
determining the point in the change log based at least in part on a sequence indicator corresponding to an event in the change log;
generating metadata for the snapshot indicating the point in the change log; and
storing the metadata for the snapshot to the data store.

12. The method of claim 6, further comprising:
receiving a request to restore the partition of the database to a state at a specified point-in-time;
retrieving a stored full snapshot of the database generated at a time near the specified point-in-time;
applying a second portion of the change log to the stored snapshot to generate a restored partition of the database, wherein the second portion of the change log was generated between generation of the snapshot and the specified point-in-time; and
restoring the partition of the database to the state at the specified point-in-time using the restored partition.

13. The method of claim 12, wherein the stored full snapshot was generated at a time after the specified point-in-time, wherein the second portion of the change log is applied in reverse chronological order.

14. A non-transitory, computer-readable storage medium storing instructions that, when executed by one or more processors, cause the one or more processors to:
determine, responsive to an indication to take a current snapshot of a partition of a database, a log size and operation type statistics for a portion of a change log for the partition, wherein the portion of the change log indicates changes to the partition since a previous snapshot;
determine a snapshot type for the partition based at least in part on the log size and the operation type statistics, wherein the snapshot type specifies a log-based snapshot or a full snapshot; and
store the snapshot as data indicating a point in the change log if the determined snapshot type is log-based snapshot or store the snapshot as complete data of the partition if the determined snapshot type is full snapshot.

15. The non-transitory, computer-readable storage medium of claim 14, wherein to determine the snapshot type for the partition the instructions further cause the one or more processors to:
determine, based at least in part on the operation type statistics, whether a first percentage of performed operations having a first operation type is greater than a second percentage of performed operations having than a second operation type.

16. The non-transitory, computer-readable storage medium of claim 14, wherein to store the snapshot as data indicating the point in the change log the instructions further cause the one or more processors to:
determine the point in the change log based at least in part on a timestamp indicator corresponding to an event in the change log;
generate metadata for the snapshot indicating the point in the change log; and
store the metadata for the snapshot to the data store.

17. The non-transitory, computer-readable storage medium of claim 14, wherein the instructions further cause the one or more processors to:
in response to the determined snapshot type being full snapshot, determining whether to generate the full snapshot from the database service or from the change log based at least in part on the log size and workload at a database service.

18. The non-transitory, computer-readable storage medium of claim 17, wherein based at least in part on a determination to generate the full snapshot from the database service, to store the snapshot as complete data the instructions further cause the one or more processors to:
send, to a database service, a request to retrieve the complete data of the partition;
generate the full snapshot from the complete data received from the database service; and
send the full snapshot to a data store.

19. The non-transitory, computer-readable storage medium of claim 17, wherein based at least in part on a determination to generate the full snapshot from the change log, to store the snapshot as complete data the instructions further cause the one or more processors to:
retrieve a stored full snapshot of the partition of the database from a data store;
apply the portion of the change log to the stored full snapshot to generate the full snapshot; and
send the full snapshot to a data store.

20. The non-transitory, computer-readable storage medium of claim 14, wherein the instructions further cause the one or more processors to:
receive a request to restore the partition of the database to a state at a specified point-in-time;
retrieve a stored full snapshot of the database generated at a time near the specified point-in-time;
apply a second portion of the change log to the stored snapshot to generate a restored partition of the database, wherein the second portion of the change log was generated between generation of the snapshot and the specified point-in-time; and
restore the partition of the database to the state at the specified point-in-time using the restored partition.

\* \* \* \* \*